United States Patent
Kawashima et al.

(10) Patent No.: US 7,019,624 B2
(45) Date of Patent: Mar. 28, 2006

(54) FORKLIFT

(75) Inventors: Kazuhito Kawashima, Kyoto (JP); Hajime Muragishi, Kyoto (JP)

(73) Assignee: Nippon Yusoki Co., Ltd., Kyoto (JP)

( * ) Notice: Subject to any disclaimer, the term of this patent is extended or adjusted under 35 U.S.C. 154(b) by 296 days.

(21) Appl. No.: 10/413,402

(22) Filed: Apr. 15, 2003

(65) Prior Publication Data

US 2004/0036581 A1    Feb. 26, 2004

(30) Foreign Application Priority Data

Aug. 9, 2002  (JP) ............................ P2002-234013
Aug. 30, 2002 (JP) ............................ P2002-253843

(51) Int. Cl.
*B60Q 1/00* (2006.01)

(52) U.S. Cl. ................... 340/425.5; 340/465; 340/475; 340/679

(58) Field of Classification Search ............. 340/425.5, 340/465, 475, 679
See application file for complete search history.

(56) References Cited

U.S. PATENT DOCUMENTS

| | | | |
|---|---|---|---|
| 4,728,923 A * | 3/1988 | Finger | 340/438 |
| 5,325,935 A * | 7/1994 | Hirooka et al. | 180/411 |
| 6,650,242 B1 * | 11/2003 | Clerk et al. | 340/425.5 |
| 6,732,824 B1 * | 5/2004 | Sugata | 180/411 |
| 6,784,800 B1 * | 8/2004 | Orzechowski | 340/679 |

FOREIGN PATENT DOCUMENTS

JP          02279435 A   *  11/1990

* cited by examiner

*Primary Examiner*—Thomas Mullen
(74) *Attorney, Agent, or Firm*—Sughrue Mion, PLLC

(57) ABSTRACT

A forklift has a driving wheel capable of being steered by 360°, a steering angle detecting section for detecting a steering angle of the driving wheel, a rotary direction detecting section for detecting a rotary direction of the driving wheel, a running direction judging section for judging a running direction of the forklift based on the steering angle of the driving wheel and the rotary direction of the driving wheel. The forklift further includes a display, advancing chime and reversing buzzer for announcing the result of judgment obtained by the running direction judging section.

8 Claims, 21 Drawing Sheets

FIG. 3 (a)
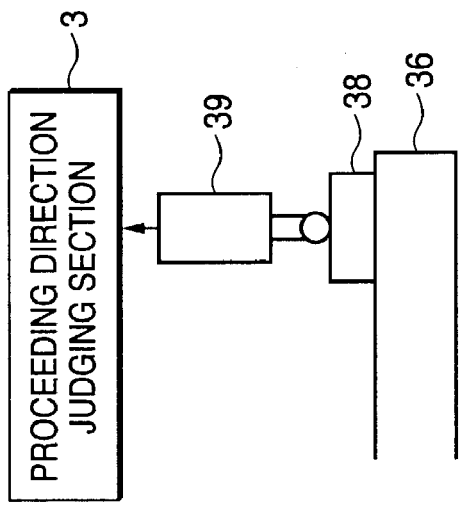
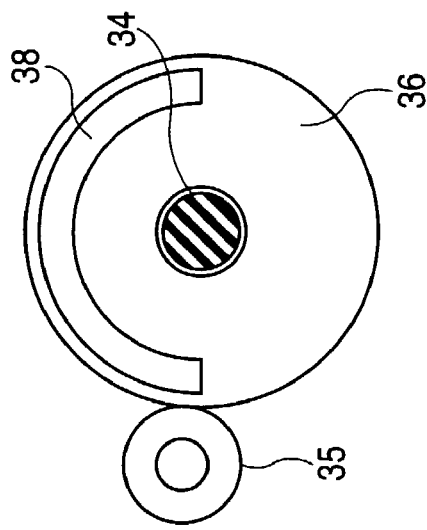
FIG. 3 (b)
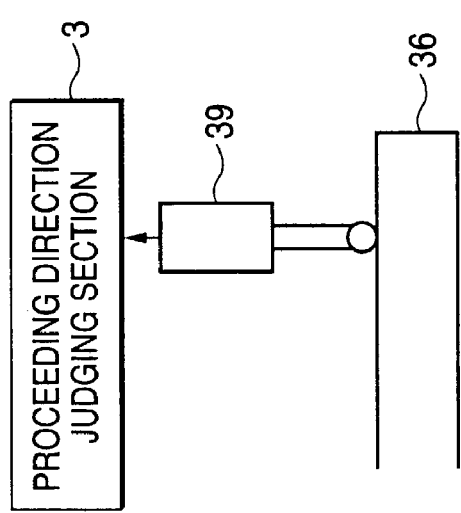
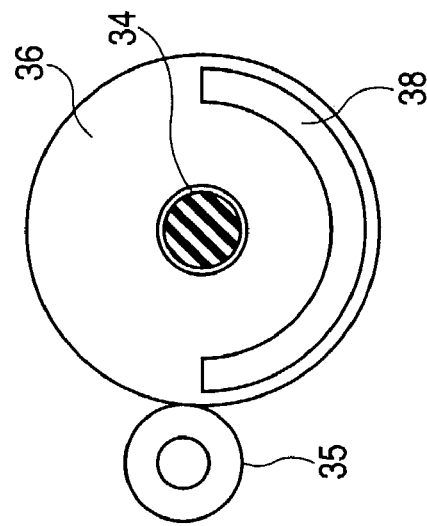

FORKLIFT

BACKGROUND OF THE INVENTION

1. Field of the Invention

The present invention relates to a forklift provided with a driving wheel capable of being steered by 360°.

2. Description of the Related Art

There is conventionally provided a seat-riding reach type forklift 21, which will be referred to as a forklift hereinafter, shown in FIG. 6. In the forklift 21, an operator sits on a seat 22. While operating a steering wheel 25 with his left hand, the operator operates a directional switch 23 shown in FIG. 7 with his right hand so as to control the direction of movement (i.e., running or proceeding direction) of the forklift 21. When the operator adjusts an amount of pressure on the accelerator foot pedal arranged on a floor 26 of the forklift 21, the running speed of the forklift 21 can be controlled.

In this forklift 21, there is a type in which a steering angle of the driving wheel 24 is restricted by a stopper so that the steering angle can be in a range ±90° with respect to the front of the forklift 21. Alternatively, there is a type in which the stopper is not provided, and the driving wheel 24 is configured so that it can be steered in a 360° range. In the former case, the rotary direction of the running motor for driving the driving wheel 24 is primarily determined by the position of the directional switch 23. For example, when the directional switch 23 is positioned, or tilted, toward the operator's side, the running motor is normally rotated, and the forklift 21 advances forward. In the latter case, it is possible to apply the structure of the former case, and the rotary direction of the running motor for driving the driving wheel 24 is primarily determined by the tilting position of the directional switch 23.

FIGS. 8 to 12 are views showing a state of the forklift 21 in which the operator gradually turns the steering wheel 25. It should be noted that the forklift 21 is drawn in a simplified manner in FIGS. 8 to 12. In FIGS. 8 to 12, two triangles express the directional switch 23, and one of the triangles, which is painted out black, means that the directional switch 23 has a position in which it is tilted to this black triangle side. When the directional switch 23 is tilted to the front side of the forklift 21, that is, when the directional switch 23 is tilted to the front side of the operator, the running motor is normally rotated, so that the driving wheel is normally rotated, i.e., the driving wheel undergoes a forward rotation so that the forklift is driven in a forward direction. When the directional switch 23 is tilted to the rear side of the forklift 21, that is, when the directional switch 23 is tilted to the rear side of the operator, the running motor is reversely rotated, so that the driving wheel 24 is reversely rotated, i.e. the forklift is driven in a rearward direction.

FIG. 8 is a view showing a state in which the driving wheel 24 is normally rotated and the steering angle is 0° with respect to the front direction of the forklift 21. As shown by the arrow in the drawing, the forklift 21 proceeds straight. FIG. 9 is a view showing a state in which the driving wheel 24 is normally rotated and the steering angle is −45° with respect to the front direction of the forklift 21. As shown by the arrow in the drawing, the forklift 21 proceeds diagonally to the right by 45°. FIG. 10 is a view showing a state in which the driving wheel 24 is normally rotated and the steering angle is −90° with respect to the front direction of the forklift 21. As shown by the arrow in the drawing, the forklift 21 is driven toward the right so as to revolve around the intermediate point of the two idler wheels 27a, 27b which are arranged at the rear. FIG. 11 is a view showing a state in which the driving wheel 24 is normally rotated and the steering angle is −135° with respect to the front direction of the forklift 21. As shown by the arrow in the drawing, the forklift 21 reverses diagonally to the right. FIG. 12 is a view showing a state in which the driving wheel 24 is normally rotated and the steering angle is −180° with respect to the front direction of the forklift 21. As shown by the arrow in the drawing, the forklift undergoes a rearward straight movement.

In this forklift 21, the driving wheel 24 of which can be steered by 360°, only by turning the steering wheel 25, the running direction of the forklift 21 can be freely changed. Therefore, this forklift 21 is advantageous in that the operability is higher than that of a forklift in which the steering angle of the driving wheel 24 is restricted by a stopper.

On the other hand, in order to ensure the safety of others in the immediate surroundings of the forklift during loading and unloading operations it is conventional that an audio warning is activated to indicate the running direction of the forklift. For example, in the case of a forklift in which the steering angle of the driving wheel 24 is restricted by the stopper and the rotary direction of the running motor is primarily determined by the position of the directional switch 23, when the directional switch 23 is positioned to tilt to the front direction of the forklift 21, that is, when the directional switch 23 is tilted to the front side of the operator, a chime indicating forward movement is sounded. On the other hand, when the directional switch 23 is tilted to the rear direction of the forklift 21, that is, when the directional switch 23 is tilted to the rear side of the operator, a buzzer indicating reverse movement is sounded.

In the case of the forklift 21 in which the driving wheel can be steered by 360°, in order to ensure safety of others during loading and unloading operations, it is necessary to inform those in the surrounding area of the direction of movement of the forklift 21. However, in this case, when the above warning method, which is performed only according to the tilted position of the directional switch 23, is adopted, the following problems may be encountered.

The tilting direction of the directional switch 23 shown in FIG. 8 is in the same state as that of the directional switch 23 shown in FIG. 12, and the rotary direction of the driving wheel 24 shown in FIG. 8 is the same as that of the driving wheel 24 shown in FIG. 12. However, the steering angle of the driving wheel 24 shown in FIG. 8 is different from that of the driving wheel 24 shown in FIG. 12 by 180°. Accordingly, the running direction of the forklift 21 shown in FIG. 8 is opposite to that of the forklift 21 shown in FIG. 12. In the case shown in FIG. 13, the tilted position of the directional switch 23 is opposite to that of the directional switch 23 shown in FIG. 8, and the rotary direction of the driving wheel 24 shown in FIG. 13 is opposite to that of the driving wheel 24 shown in FIG. 8. However, the steering angle of the driving wheel 24 shown in FIG. 13 is different from that of the driving wheel 24 shown in FIG. 8 by 180°. Therefore, the direction of movement of the forklift 21 shown in FIG. 13 is the same as that of the forklift 21 shown in FIG. 8. In the case shown in FIG. 14, the tilted position of the directional switch 23 is opposite to that of the directional switch 23 shown in FIG. 12, and the rotary direction of the driving wheel 24 shown in FIG. 14 is opposite to that of the driving wheel 24 shown in FIG. 12. However, the steering angle of the driving wheel 24 shown in FIG. 14 is different from that of the driving wheel 24 shown in FIG. 12 by 180°. Therefore, the direction of movement of the forklift 21 shown in FIG. 14 is the same as that of the forklift 21 shown in FIG.

12. That is, the following problematic cases may occur. While the directional switch 23 is tilted to the front side of the operator and the chime of forward movement is activated, the forklift 21 is actually moving in the rearward, i.e., reverse, direction. Further, while the directional switch 23 is tilted to the rear side of the operator and the reverse buzzer is activated, the forklift 21 is actually moving forward. Therefore, when workers in the surrounding area of the forklift 21 judge the direction of movement of the forklift 21 solely by the sound of the forward chime or the rearward buzzer, the workers in the surrounding area may be misinformed and make erroneous judgments concerning safety.

On the other hand, when the forklift 21 is started again, for example, after it has been once stopped in order to conduct a loading or unloading operation, or when the operator is replaced, in the case where the directional switch 23 is tilted to the front side of the operator, it is impossible for the operator to know which direction the forklift 21 is going to move when restarted. When the operator drives the forklift 21 while the direction of movement (i.e., running direction or proceeding direction) of the forklift 21 is unknown, the workers in the surrounding areas of the forklift 21 may be exposed to danger.

A conventional forklift is provided with direction indicating lamps which indicate which direction, i.e., right or left, the forklift will proceed, so that workers in the surrounding area of the forklift can determine which direction the forklift will move. When an operator manually operates a direction indicating lever, an indicating lamp turns on which corresponds to the direction of movement of the forklift. Concerning the direction indicating lever, there is a type of direction indicating lever capable of being manually returned to the neutral position from the right or the left indicating position. There is also a type of direction indicating lever capable of being automatically returned to the neutral position from the right or the left indicating position when a steering wheel is turned back by an angle not less than a predetermined angle. Such types of direction indicating levers are widely used.

On the other hand, a forklift is provided with a head lamp and rear lamp so that the forklift can run safely when the direction of movement is illuminated by the lamps. It is common that these head lamps and rear lamps are turned on and off when the operator manually operates a switch.

In this connection, a forklift moves (runs) in a direction to which the driving wheel is directed. However, there is provided a forklift, the driving wheel of which is capable of revolving by 360°. This forklift is capable of running in all directions. It is difficult for workers in the surrounding area of this forklift, the driving wheel of which is capable of revolving by 360°, to recognize which direction it will move. Accordingly, there is a possibility that the forklift runs in a direction which is not expected by the workers in the surrounding area of this forklift.

In order to solve the above problems, it is preferable for the operator to operate an indication lamp so that the workers in the surrounding area of the forklift can visually recognize the proceeding direction of the forklift. However, there is a possibility that the operator neglects his duty and drives the forklift without giving a signal of the proceeding direction of forklift. In this way, there is a possibility that the function of the indication lamp is not used even when the forklift is provided with the indication lamp.

On the other hand, for the forklift having a driving wheel which is capable of revolving by 360°, even when the rotary direction of the driving wheel is the same, the direction of movement of the forklift can be freely changed by revolving the driving wheel, and thus, an excellent operability can be realized by this type forklift.

However, in the case where a direction of movement of the forklift is changed by revolving the driving wheel from a state of forward movement, in which the head light is turned on, to a state of reverse movement, the forklift is reversing while the head lamp remains turned on. In order to solve the above problem, the operator must manually operate the switch to turn on and off the head light each time the direction of movement is changed. In this case, there is a possibility that the operator forgets to operate the switch. There is also a possibility that the time of operating the switch is delayed and the forklift continues to run as it is.

SUMMARY OF THE INVENTION

The present invention has been accomplished to solve the above problems. It is an object of the present invention to provide a forklift, the driving wheel of which can be steered by 360°, capable of accurately informing workers, who are present in the surrounding areas of the forklift, of the direction of movement of the forklift.

In order to accomplish the above object, according to a first aspect of the present invention, there is provided a forklift including: a driving wheel capable of being steered by 360°; a steering angle detecting section for detecting a steering angle of the driving wheel; a rotary direction detecting section for detecting a rotary direction of the driving wheel; a running direction judging section for judging a running direction of the forklift according to the steering angle of the driving wheel detected by the steering angle detecting section and the rotary direction of the driving wheel detected by the rotary direction detecting section; and an announcing section for informing the result of judgment obtained by the running direction judging section.

The steering angle detecting section is capable of detecting a steering angle of the driving wheel in a range from −180° to +180° with respect to the front direction of the forklift, and the rotary direction detecting section detects whether the driving wheel is rotating normally or reversely. In this constitution, the running direction judging section may judge that a running direction of the forklift is the advancing direction (i.e. direction of movement) in the case where a steering angle of the driving wheel is in a range ±90° with respect to the advancing direction of the forklift and the driving wheel is normally rotated, the running direction judging section may judge that a running direction of the forklift is the reversing direction in the case where a steering angle of the driving wheel is in a range ±90° with respect to the front direction of the forklift and the driving wheel is reversely rotated, the running direction judging section may judge that a running direction of the forklift is the reversing direction in the case where a steering angle of the driving wheel exceeds a range from −90° to +90° with respect to the front direction of the forklift and the driving wheel is normally rotated, and the running direction judging section may judge that a running direction of the forklift is the advancing direction in the case where a steering angle of the driving wheel exceeds a range from −90° to +90° with respect to the front direction of the forklift and the driving wheel is reversely rotated.

Concerning the rotary direction detecting section, it is possible to adopt an encoder attached to the rotary shaft of the driving wheel so that the rotary direction of the driving wheel can be directly detected. Further, it is possible to adopt a rotary direction detecting section for indirectly detecting the rotary direction of the driving wheel when the rotary direction of the running motor to drive the driving wheel is detected. Furthermore, in the case of a forklift in which the rotary direction of the running motor is primarily determined by the tilting direction of the directional switch, it is possible to adopt a rotary direction detecting section for indirectly detecting the rotary direction of the driving wheel when the tilting direction of the directional switch is detected.

The announcing section may be provided with a display for visually displaying the result of judgment at a position where an operator can visually recognize, the display may display that the forklift is advancing in the case where the running direction judging section judges that the forklift is advancing, and the display may display that the forklift is reversing in the case where the running direction judging section judges that the forklift is reversing. Specifically, marks, pictures and characters may be written on a display or indicator arranged in the operator's seat so that the running direction of the forklift can be displayed. Due to the foregoing, it is possible for the operator to safely drive the forklift after the operator has known the running direction of the forklift by seeing the content shown on the display means.

The announcing section may be provided with a sound outputting section for acoustically outputting the result of judgment to the surroundings of the forklift, the sound outputting section may output a sound expressing that the forklift is advancing in the case where the running direction judging section judges that the forklift is advancing, and the sound outputting means may output a sound expressing that the forklift is reversing in the case where the running direction judging section judges that the forklift is reversing. Specifically, a chime and buzzer respectively capable of outputting different sounds may be provided. Alternatively, a buzzer capable of outputting sounds at a plurality of different periods may be provided so that the output sounds can be distinguished from each other. Due to the foregoing, it is possible for the workers in the surroundings of the forklift to listen to the sounds outputted from the sound outputting section and accurately know the movement of the forklift.

In addition to the above constitution, a forklift may further include: a driving wheel stoppage detecting section for detecting the stoppage of rotation of the driving wheel; a storing section for storing a running direction of the forklift immediately before rotation of the driving wheel is stopped when stoppage of the rotation of the driving wheel is detected by the driving wheel stoppage detecting section; and a start detecting section for detecting a start of the forklift, wherein the announcing section informs the running direction stored in the storing section when the start detecting section detects that the forklift is started.

It is another object of the present invention to provide a forklift, the driving wheel of which can be revolved by 360°, capable of enhancing the safety of workers by positively exhibiting the functions of the indication lamp, head lamp and rear lamp.

In order to accomplish the above object, according to a second aspect of the invention, there is provided a forklift including: a vehicle body; a driving wheel capable of revolving by 360°; an advancing indication lamp for indicating the vehicle body to advance; a reversing indication lamp for indicating the vehicle body to reverse; a left proceeding indication lamp for indicating the vehicle body to proceed to left; a right proceeding indication lamp for indicating the vehicle body to proceed to right; a revolving angle detecting section for detecting a revolving angle of the driving wheel; a rotary direction detecting section for detecting a rotary direction of the driving wheel; and an indication lamp control section for turning on either of the indication lamps according to the revolving angle and the rotary direction.

In this case, the indication lamp control section turns on the advancing indication lamp when the revolving angle is in a range ±45° with respect to the front direction of the vehicle body and the rotary direction is normal, and when the revolving angle is in a range from not less than 135° to less than 180° with respect to the front direction of the vehicle body or the revolving angle is in a range from not less than −180° to less than −135° and the rotary direction is reverse, the indication lamp control section turns on the reversing indication lamp when the revolving angle is in a range ±45° with respect to the front direction of the vehicle body and the rotary direction is reverse, and when the revolving angle is in a range from not less than 135° to less than 180° with respect to the front direction of the vehicle body or the revolving angle is in a range from not less than −180° to less than −135° and the rotary direction is normal, the indication lamp control section turns on the left proceeding indication lamp when the revolving angle is in a range from not less than 45° to less than 135° with respect to the front direction of the vehicle body and the rotary direction is normal, and when the revolving angle is in a range from not less than −135° to less than −45° with respect to the front direction of the vehicle body and the rotary direction is reverse, and the indication lamp control section turns on the right proceeding indication lamp when the revolving angle is in a range from not less than 45° to less than 135° with respect to the front direction of the vehicle body and the rotary direction is reverse, and when the revolving angle is in a range from not less than −135° to less than −45° with respect to the front direction of the vehicle body and the rotary direction is normal.

It is preferable that the indication lamps are configured as follows because the indication lamps can be visually recognized from the indicated proceeding direction and from both directions perpendicular to the indicated proceeding direction. The advancing indication lamp is arranged being protruded forward from the front face of the vehicle body so that it can be visually recognized from the three directions of the front, right and left of the vehicle body. The rear proceeding indication lamp is arranged being protruded rearward from the rear face of the vehicle body so that it can be visually recognized from the three directions of the rear, right and left of the vehicle body. The left proceeding indication lamp is arranged being protruded to left from the left face of the vehicle body so that it can be visually recognized from the three directions of the left, front and rear of the vehicle body. The right proceeding indication lamp is arranged being protruded to right from the right face of the vehicle body so that it can be visually recognized from the three directions of the right, front and rear of the vehicle body.

When the indication lamps are configured as described above, in the case where the forklift runs in the front direction, the advancing indication lamp is automatically turned on, in the case where the forklift runs in the rear direction, the reversing indication lamp is automatically turned on, in the case where the forklift runs to left, the left proceeding indication lamp is automatically turned on, and in the case where the forklift runs to right, the right proceeding indication lamp is automatically turned on. As a result, each indication lamp can be turned on without any operation by the operator. Therefore, labor of operation can be saved and further each indication lamp can be positively turned on. Workers in the surroundings of the forklift can positively, visually recognize an indication lamp, which has been turned on, among the indication lamps. Therefore, they can easily know the proceeding direction of the forklift.

When each indication lamp is primarily operated, it is possible to primarily select and indicate a proceeding direction of the forklift from the front, rear, left and right. Further, in addition to the four directions of the front, rear, left and right, when the advancing indication lamp and the right or left proceeding indication lamp are simultaneously turned on or when the reversing indication lamp and the right or left proceeding indication lamp are simultaneously turned on, that is, when the two indication lamps, which are compatible with each other, are simultaneously turned on, the diagonal four directions can be indicated by the two indication lamps.

According to a third aspect of the invention, there is provided a forklift including: a vehicle body; a driving wheel capable of revolving by 360°; a left proceeding indication lamp for indicating the vehicle body to proceed to left; a right proceeding indication lamp for indicating the vehicle body to proceed to right; a revolving angle detecting section for detecting a revolving angle of the driving wheel; a rotary direction detecting section for detecting a rotary direction of the driving wheel; and an indication lamp control section for turning on either of the indication lamps according to the revolving angle and the rotary direction.

The indication lamp control section turns on the left proceeding lamp when the revolving angle is in a range from not less than the first angle to less than the second angle counterclockwise with respect to the front direction of the vehicle body and the rotary direction is normal, and when the revolving angle is in a range from not less than the first angle to less than the second angle clockwise with respect to the front direction of the vehicle body and the rotary direction is reverse, and the indication lamp control section turns on the right proceeding lamp when the revolving angle is in a range from not less than the first angle to less than the second angle counterclockwise with respect to the front direction of the vehicle body and the rotary direction is reverse, and when the revolving angle is in a range from not less than the first angle to less than the second angle clockwise with respect to the front direction of the vehicle body and the rotary direction is normal. Specifically, for example, the first angle can be determined to be 45°, and the second angle can be determined to be 135°. In this case, when the counterclockwise revolving angle is determined to be positive, a range from not less than the first angle to less than the second angle counterclockwise with respect to the front direction of the vehicle body is a range from not less than 45° to less than 135° with respect to the front direction of the vehicle body. A range from not less than the first angle to less than the second angle clockwise with respect to the front direction of the vehicle body is a range from more than −135° to not more than −45° with respect to the front direction of the vehicle body. In this connection, "a range from not less than the first angle to less than the second angle" may be substituted by "a range from more than the first angle to not more than the second angle". Further, "a range from not less than the first angle to less than the second angle" may be substituted by "a range from more than the first angle to less than the second angle". Furthermore, "a range from not less than the first angle to less than the second angle" may be substituted by "a range not less than the first angle to not more than the second angle".

Due to the foregoing, when the forklift runs to left, the left proceeding indication lamp is automatically turned on. When the forklift runs to right, the right proceeding indication lamp is automatically turned on. As a result, the left and the right proceeding indication lamp can be turned on without any operation by the operator. Therefore, labor of operation can be saved and further the left or the right proceeding indication lamp can be positively turned on. Workers in the surroundings of the forklift can positively, visually recognize an indication lamp, which has been turned on, of the left and the right proceeding indication lamp. Therefore, the workers in the surroundings of the forklift can easily know the proceeding direction of the forklift.

According to a fourth aspect of the invention, there is provided a forklift including: a vehicle body; a driving wheel capable of revolving by 360°; a head lamp for illuminating the front of the vehicle; a rear lamp for illuminating the rear of the vehicle; a rotary direction detecting section for detecting a rotary direction of the driving wheel; and an illuminating lamp control section for controlling to turn on and off the head lamp and rear lamp according to the revolving angle and the rotary direction.

The illuminating lamp control section turns on the head lamp and turns off the rear lamp when the revolving angle is in a range ±90° with respect to the front direction of the vehicle and the rotary direction is normal, and when the revolving angle exceeds a range ±90° with respect to the front direction of the vehicle and the rotary direction is reverse, and the illuminating lamp control section turns off the head lamp and turns on the rear lamp when the revolving angle is in a range ±90° with respect to the front direction of the vehicle and the rotary direction is reverse, and when the revolving angle exceeds a range ±90° with respect to the front direction of the vehicle and the rotary direction is normal.

Due to the foregoing, when the forklift runs forward, the head lamp is automatically turned on and the rear lamp is automatically turned off at the same time. When the forklift runs backward, the rear lamp is automatically turned on and the head lamp is automatically turned off at the same time. As a result, the head lamp and the rear lamp can be turned on without any operation by the operator. Therefore, labor of operation can be saved, and the head lamp or the rear lamp can positively illuminate the front or the rear of the forklift.

In this connection, turning on a light described in the second to fourth aspects includes not only continuously turning on a light but also intermittently turning on a light, that is, turning on a light described in the second to fourth aspects includes turning on and off. However, when an indication lamp is turned on, it is possible to adopt a method of turning on the indication lamp by which a viewer can easily recognize that the indication lamp has been turned on. However, in the case of turning on the head lamp or the rear lamp, from the viewpoint of brightly illuminating a place so that it can be easily viewed by the operator, it is preferable that the head lamp or the rear lamp is continuously turned on.

Electric power may be supplied to the indication lamps relating to the second to third aspects and also electric power may be supplied to the head lamp and the rear lamp relating to the fourth aspect from a battery used for electrical equipment such as an electrical steering device and a running motor mounted on the forklift. In this case, incandescent lamps and LED can be used for the electric lamps. Further, halogen lamps, fluorescent lamps and discharge lamps can be used.

The revolving angle detecting section related to the second to fourth aspects may be composed so that a revolving angle around the longitudinal axial center of the driving wheel can be detected by the revolving angle detecting section. It is possible to use a rotation detecting means such as a rotary encoder or potentiometer to detect a quantity of rotation of an arbitrary portion of the steering device, which is from the driving wheel to the steering wheel to steer the driving wheel, such as the driving wheel or steering wheel. Further, the revolving angle detecting section may be composed of a predetermined number of micro-switches, which are turned on and off by a cam linked with an arbitrary portion of the steering device, and a predetermined number of proximity switches which are turned on and off by a magnetic body linked with an arbitrary position of the steering device.

The rotary direction detecting section related to the second to fourth aspects may detect a rotary direction of the driving wheel around a wheel shaft of the driving wheel. It is possible to use a rotary direction detecting section for directly detecting a rotary direction of the driving wheel around the wheel shaft. Further, for example, the rotary direction detecting section may indirectly detect a rotary direction of the driving wheel around a wheel shaft of the driving wheel in such a manner that a rotary direction of the load wheel pivotally supported by the vehicle body is detected. Furthermore, the rotary direction detecting section may be composed of an operating direction detecting means for detecting an operating direction of the operating component such as a directional switch for controlling the rotary direction of the driving wheel. Furthermore, the rotary direction detecting section may be composed of a driving current detecting means for detecting a direction of the driving current supplied to the running motor to drive the driving wheel. Even when the above means are adopted, the rotary direction of the driving wheel around the wheel shaft can be indirectly detected.

BRIEF DESCRIPTION OF THE DRAWINGS

FIGS. 3(a) and 3(b) are schematic illustrations showing a steering angle detecting section of the embodiment;

DETAILED DESCRIPTION OF THE PREFERRED EMBODIMENTS

Figure 1:
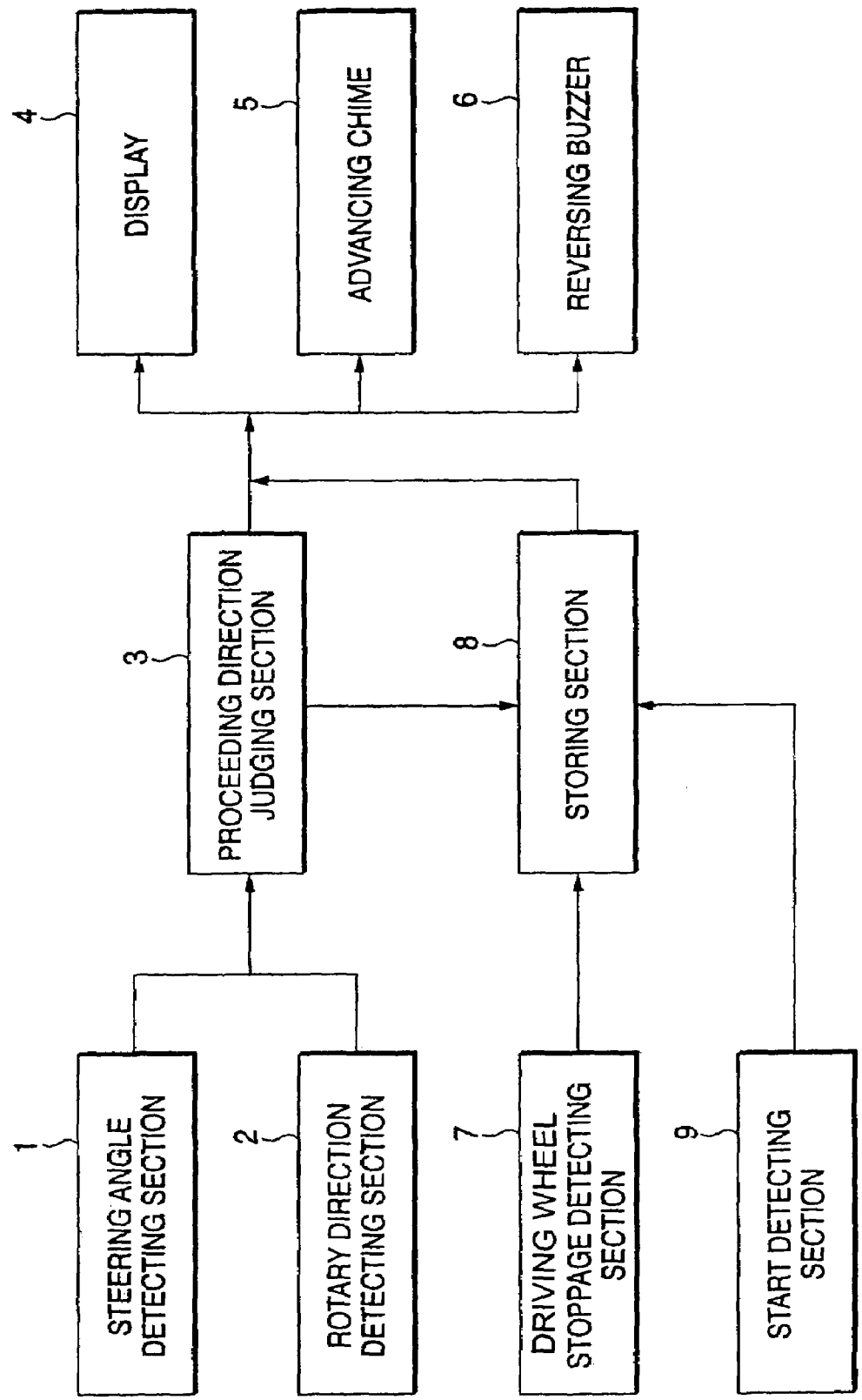
FIG. 1 is a functional block diagram showing the constitution for informing a running direction of a forklift of an embodiment of the present invention.
Figure 2:
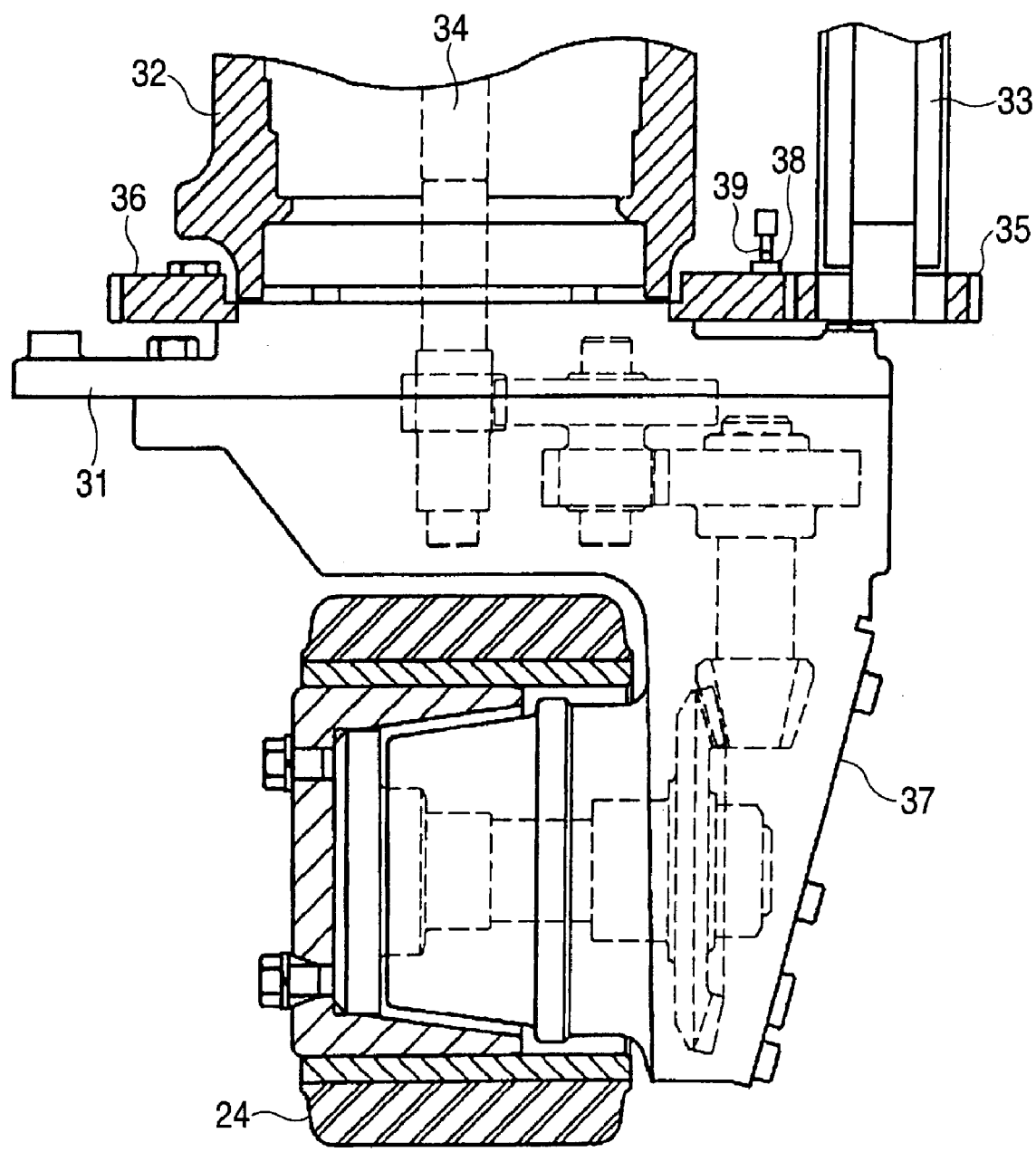
FIG. 2 is a partially sectional view showing a driving mechanism and a steering mechanism of the forklift.
Figure 4:
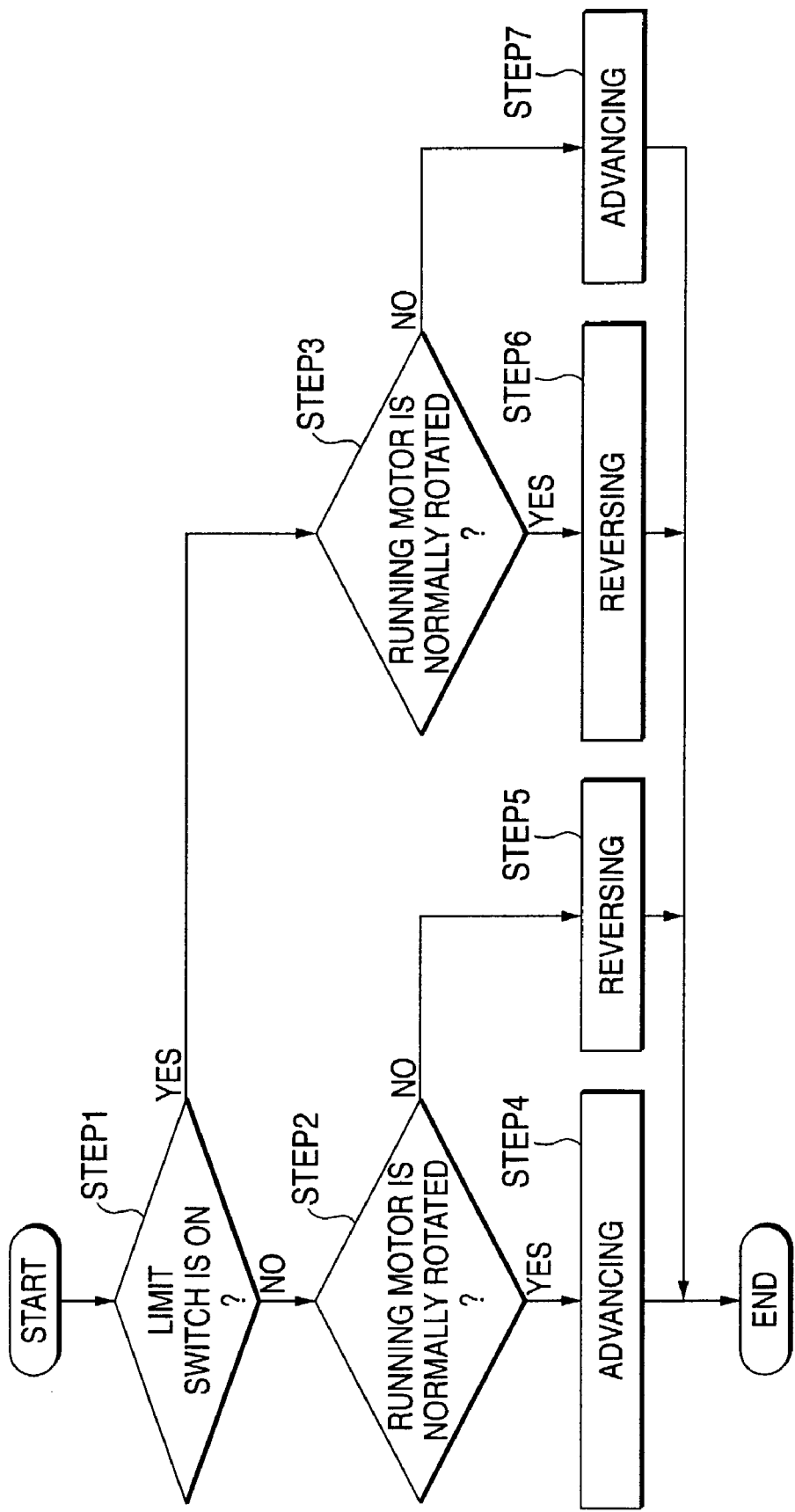
FIG. 4 is a flow chart showing a procedure of control of the embodiment.
Figure 5:
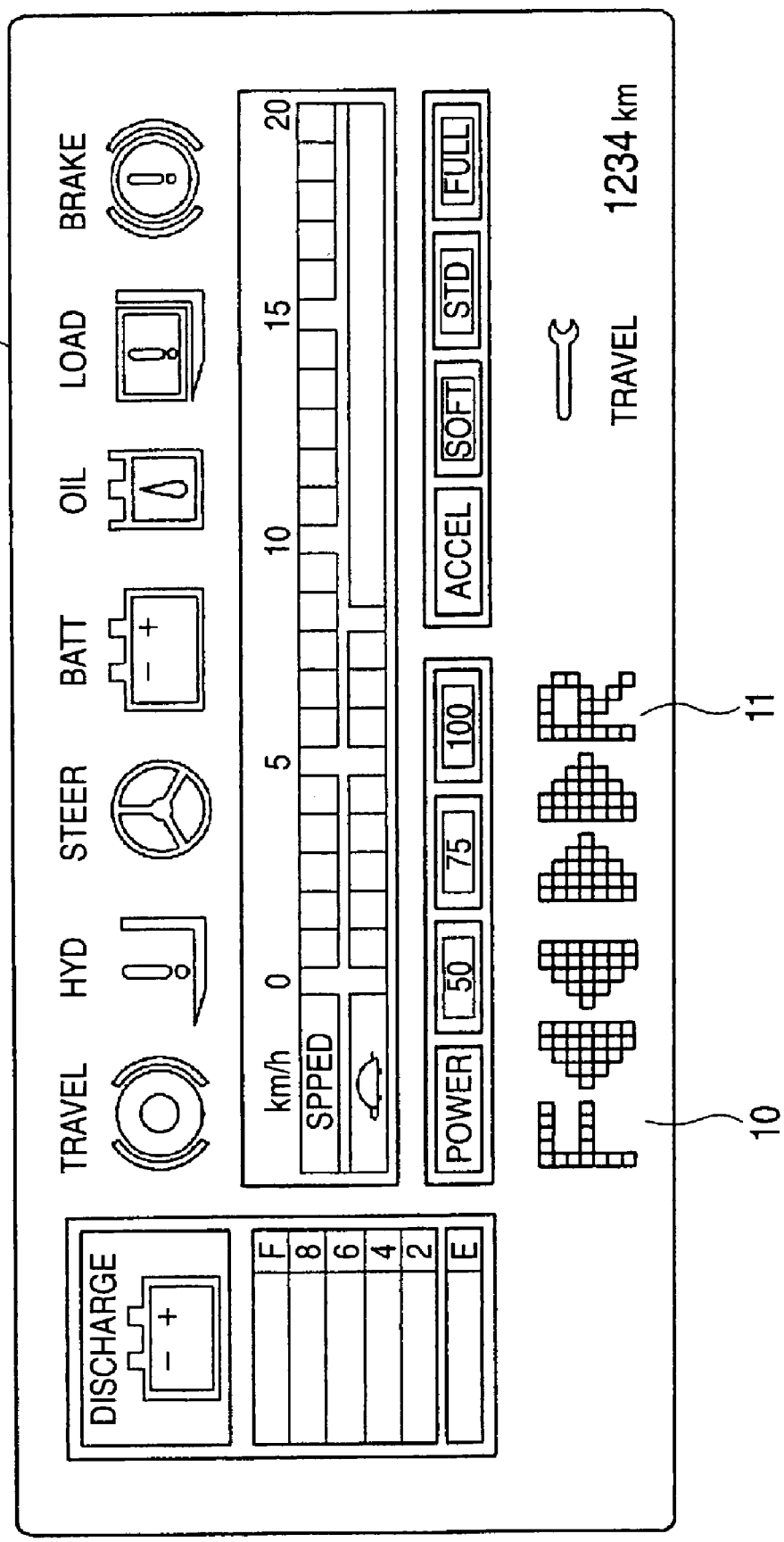
FIG. 5 is a schematic illustration of a display of the embodiment.
Figure 6:
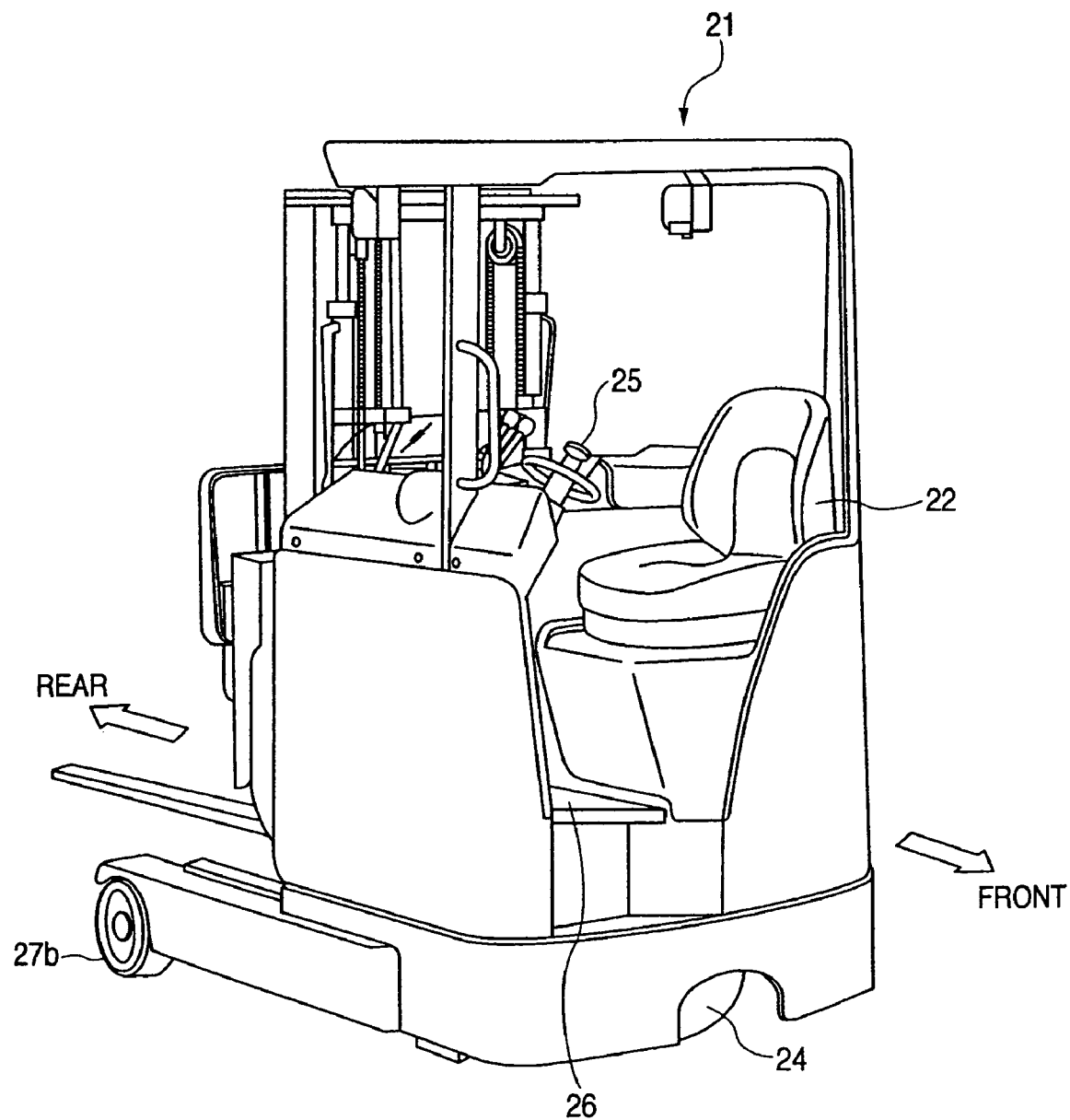
FIG. 6 is a perspective view of a forklift in which a driving wheel is arranged capable of being steered by 360°, wherein the view is taken from the front of the forklift.
Figure 7:
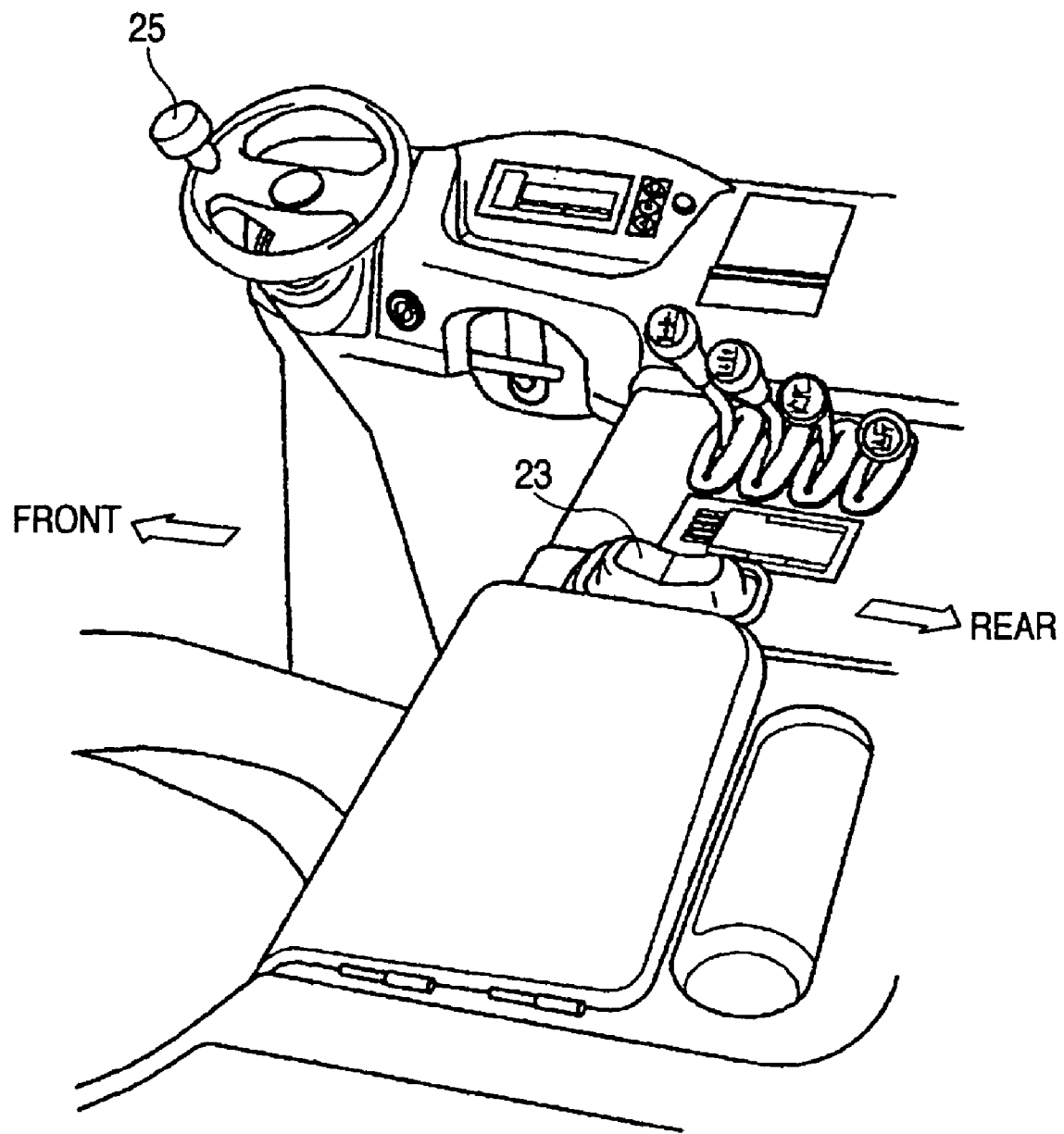
FIG. 7 is an enlarged perspective view of the neighborhood of an operator's seat of the forklift shown in FIG. 6, wherein the view is taken from the side of the forklift.

Explanations will be made of an embodiment in which the present invention is applied to a seat-riding reach type forklift, the driving wheel of which can be steered by 360°. FIG. 1 is a functional block diagram for informing of the running direction in the embodiment, FIG. 2 is a partially sectional view showing a driving mechanism and steering mechanism of the forklift of the embodiment, FIGS. 3(a) and (b) are schematic illustrations showing a steering angle detecting section of the embodiment, FIG. 4 is a flow chart showing a control procedure of the embodiment, and FIG. 5 is a schematic illustration showing a display of the embodiment. In this connection, the overall arrangement of the forklift of the embodiment is the same as that of the conventional art shown in FIGS. 6 and 7. Therefore, like reference characters are used to indicate like parts in these drawings.

In addition to the conventional constitution, as shown in FIG. 1, a forklift 21 of an exemplary embodiment includes: a steering angle detecting section 1, a rotary direction detecting section 2 and a proceeding (running) direction judging section 3. The forklift 21 of the embodiment further includes: a display 4, an advancing chime 5 and a reversing buzzer 6 which are examples of an announcing section. As shown in FIG. 1, the forklift 21 of the embodiment further includes a driving wheel stoppage detecting section 7, a storing section 8 and a start detecting section 9.

FIG. 2 shows a driving mechanism and steering mechanism of a driving wheel 24 provided in the forklift 21. As shown in FIG. 2, a running motor 32 and a steering motor 33 are mounted on a support 31 attached to a vehicle body.

The running motor 32 is connected with the driving wheel 24 via a shaft 34. It is possible for an operator to normally or reversely rotate the driving wheel 24 by the drive of the running motor 32 according to an operation of the accelerator pedal. On the other hand, according to an operation of the steering wheel conducted by the operator, the steering motor 33 is driven. When the steering motor 33 is driven, the steering gear 35 connected with the steering motor 33 is rotated. Then, when the steering gear 35 is rotated, the idler gear 36 meshed with the steering gear 35 is rotated. When the idler gear 36 is rotated, the driving wheel support section 37 for supporting the driving wheel 24 is rotated, so that the driving wheel 24 can be steered. In this connection, on an upper face of the idler gear 36, there is provided a protruding section 38. The limit switch 39 is attached at a position so that the limit switch 39 can be contacted with the protruding section 38.

As shown in FIGS. 3(*a*) and 3(*b*), the protruding section 38 provided on an upper face of the idler gear 36 is formed into a semi-cylindrical shape having a predetermined width. As shown in FIG. 3(*a*), when the steering angle of the driving wheel 24 is in a range ±90° with respect to the front direction of the forklift, the limit switch 39 is not contacted with the protruding section 38, that is, the limit switch 39 is turned off. As shown in FIG. 3(*b*), when the steering angle of the driving wheel 24 exceeds a range from −90° to +90° with respect to the front direction of the forklift, the limit switch 39 is contacted with the protruding section 38, that is, the limit switch 39 is turned on. The protruding section 38 and the limit switch 39 configure the steering angle detecting section 1 in this embodiment. In this case, the steering angle of the driving wheel 24 is defined as an internal angle formed by the front direction of the forklift 21 and the running (moving) direction of the forklift 21 which is driven by the driving wheel 24 when the driving wheel 24 is normally driven by the running motor 32. When the front direction of the forklift 21 and the running direction of the forklift 21 coincide with each other, the steering angle is zero. When the driving wheel 24 is steered counterclockwise from this state in which the steering angle is zero, a value of the steering angle is expressed by a positive value. When the driving wheel 24 is steered clockwise from this state in which the steering angle is zero, a value of the steering angle is expressed by a negative value.

In the forklift 21 of this embodiment, a rotary encoder used as the rotary direction detecting section 2 is attached to the shaft 34 of the running motor 32 to drive the driving wheel 24. A rotary direction of the running motor 32 is detected according to the phase relation of the approximate sine curve of two phases output by this rotary encoder according to the rotary direction of the running motor 32. In this embodiment, the rotary direction of the driving wheel 24 is primarily determined by the rotary direction of the running motor 32. Therefore, when the rotary direction of the running motor 32 is detected, the rotary direction of the driving wheel 24 can be indirectly detected.

The proceeding direction judging section 3 judges a proceeding (running) direction of the forklift 21 according to the result of detection conducted by the steering angle detecting section 1 and the result of detection conducted by the rotary direction detecting section 2.

Referring to FIG. 4, a procedure of control of this exemplary embodiment will be explained below.

When an operator tilts (activates) the directional switch 23 in a direction in which the operator wants the forklift 21 to move, and steps on the accelerator pedal, the running motor 32 is rotated. First of all, it is judged whether or not the limit switch 39 is turned on (step 1). Successively, it is judged whether or not the running motor 32 is normally rotated (steps 2 and 3). According to the results of judgment conducted in steps 2 and 3, it is judged whether the direction of movement of the forklift 21 is an advancing (forward) direction or a reversing direction (steps 4, 5, 6 and 7).

Figure 8:
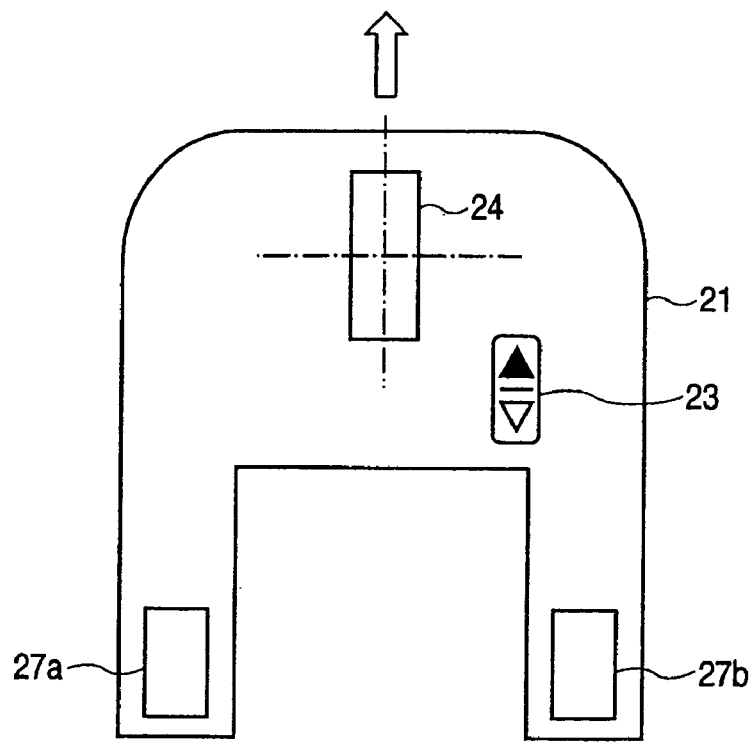
FIG. 8 is a schematic illustration showing a relation between a steering angle and rotary direction of a driving wheel and a running direction of the forklift.
Figure 9:
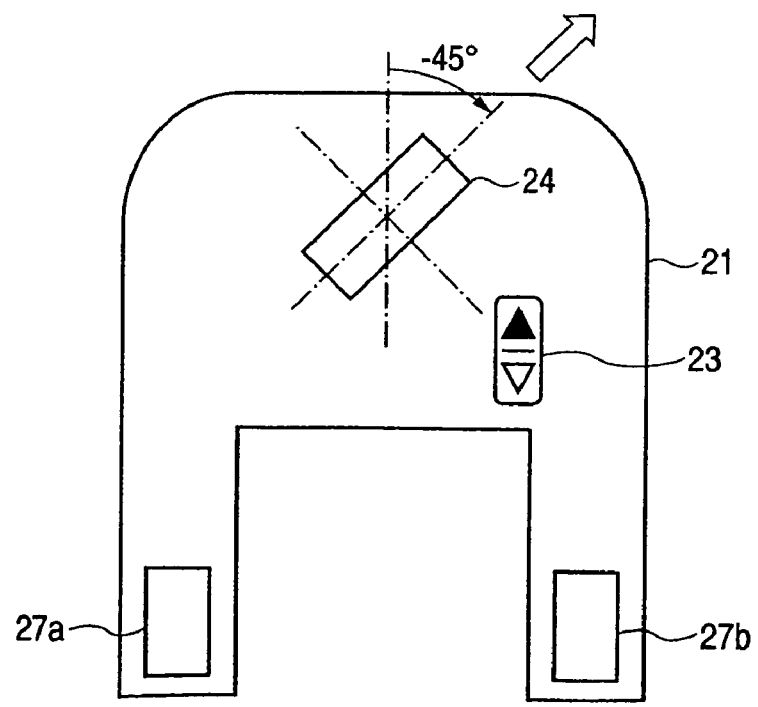
FIG. 9 is a schematic illustration showing a relation between a steering angle and rotary direction of a driving wheel and a running direction of the forklift.
Figure 10:
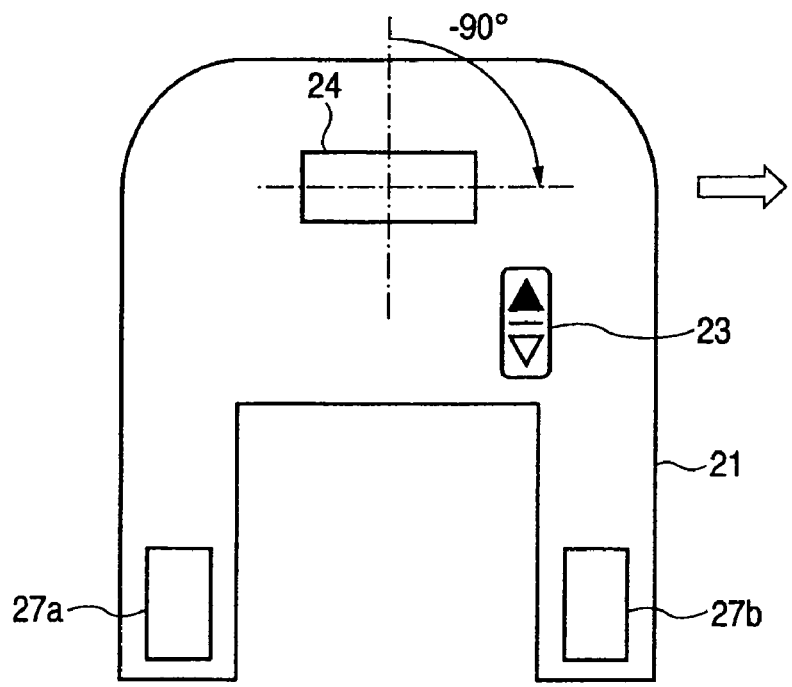
FIG. 10 is a schematic illustration showing a relation between a steering angle and rotary direction of a driving wheel and a running direction of the forklift.

Specifically, the judgment is made as follows. As shown in FIGS. 8 to 10, in the case where the limit switch 39 is turned off and it is detected that the driving wheel 24 is normally rotated, the proceeding direction judging section 3 judges in step 1 that the limit switch 39 is not turned on (NO in step 1). Successively, it is judged in step 2 that the running motor 32 is normally rotated (YES in step 2). As a result of the judgment, it is judged that the proceeding direction of the forklift 21 is an advancing (forward) direction (step 4).

Figure 14:
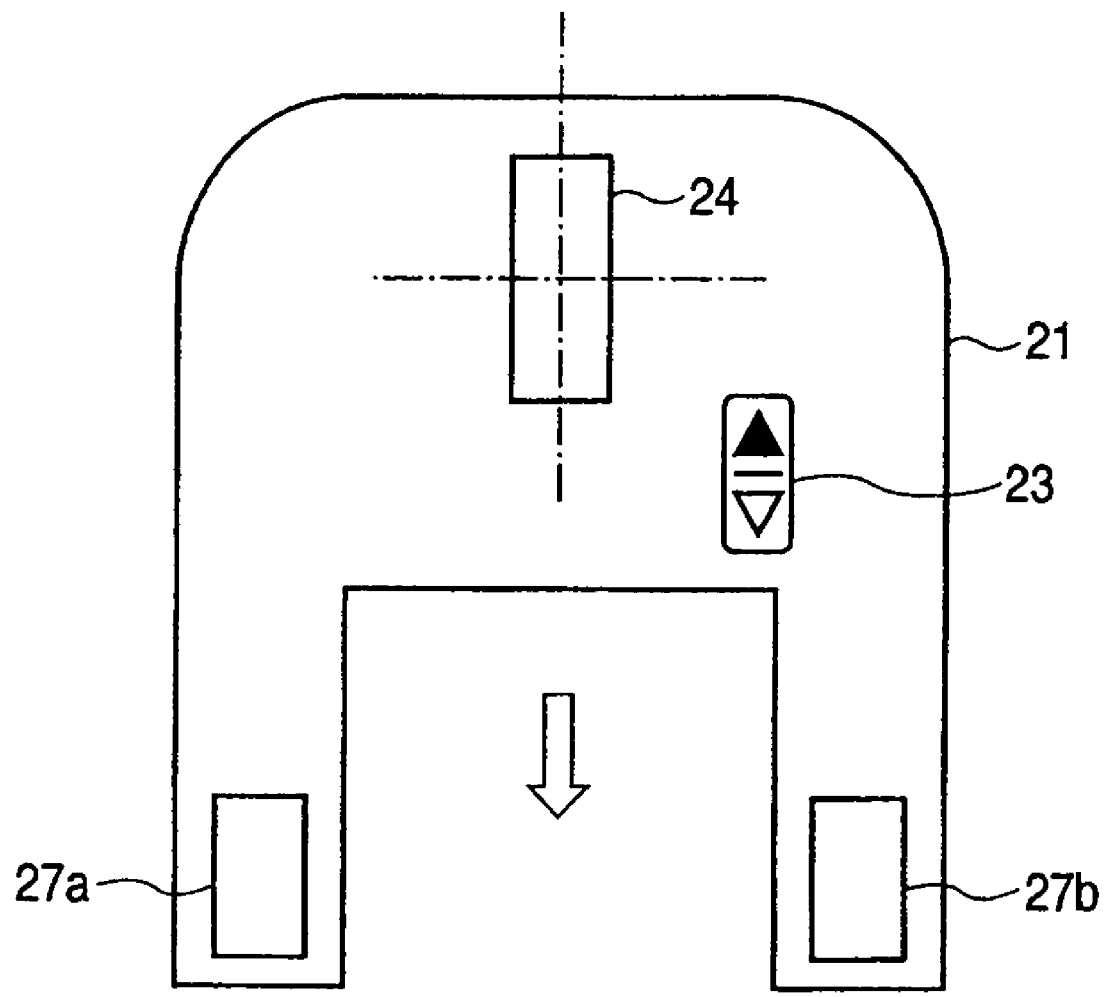
FIG. 14 is a schematic illustration showing a relation between a steering angle and rotary direction of a driving wheel and a running direction of the forklift.

As shown in FIG. 14, in the case where the limit switch 39 is turned off and it is judged that the driving wheel 24 is reversely rotated, the proceeding direction judging section 3 judges in step 1 that the limit switch 39 is not turned on (NO in step 1). Successively, it is judged in step 2 that the running motor 32 is not normally rotated (NO in step 2). As a result, it is judged that the forklift 21 is moving in a reverse direction (step 5).

Figure 11:
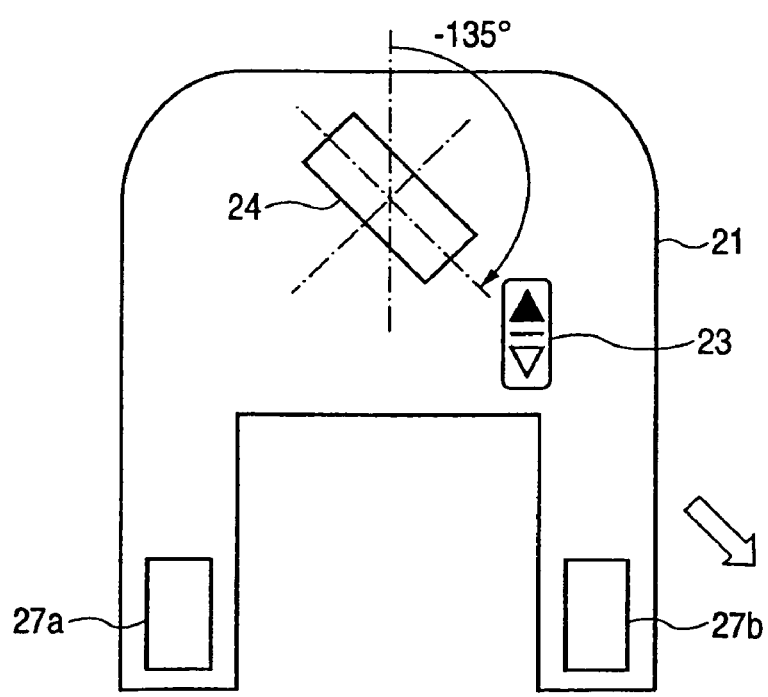
FIG. 11 is a schematic illustration showing a relation between a steering angle and rotary direction of a driving wheel and a running direction of the forklift.
Figure 12:
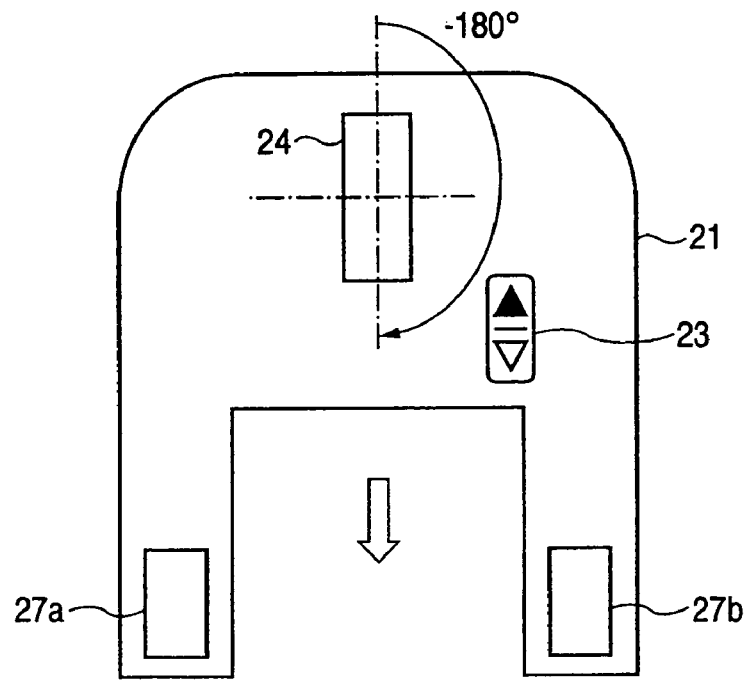
FIG. 12 is a schematic illustration showing a relation between a steering angle and rotary direction of a driving wheel and a running direction of the forklift.

As shown in FIGS. 11 and 12, in the case where the limit switch 39 is turned on and it is detected that the driving wheel 24 is normally rotated, the proceeding direction judging section 3 judges in step 1 that the limit switch 39 is turned on (YES in step 1). Successively, in step 3, it is judged that the running motor 32 is normally rotated (YES in step 3). As a result, it is judged that the forklift 21 is moving in a reverse direction (step 6).

Figure 13:
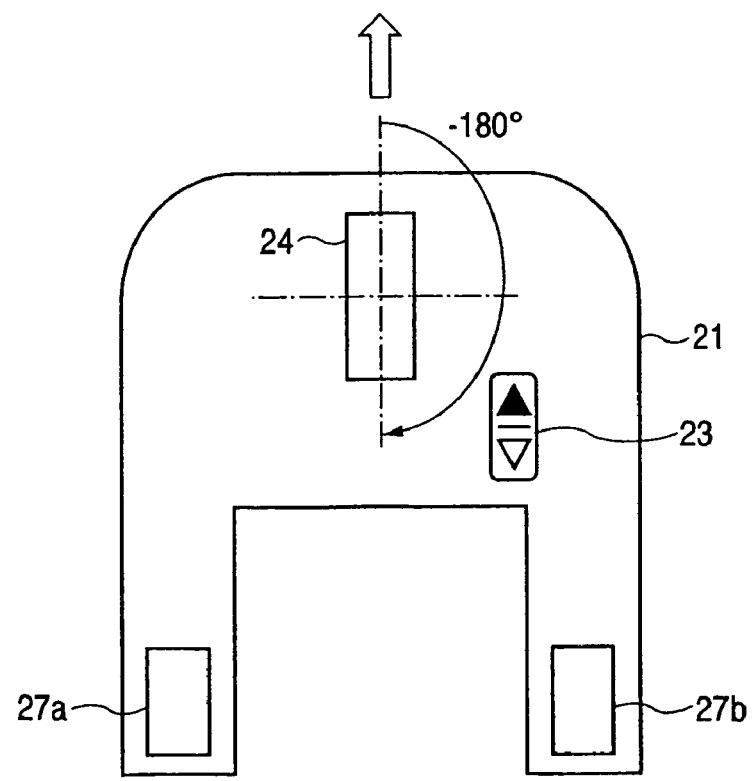
FIG. 13 is a schematic illustration showing a relation between a steering angle and rotary direction of a driving wheel and a running direction of the forklift.

As shown in FIG. 13, in the case where the limit switch 39 is turned on and it is judged that the driving wheel 24 is reversely rotated, the proceeding direction judging section 3 judges in step 1 that the limit switch 39 is turned on (YES in step 1). Successively, it is judged in step 3 that the running motor 32 is not normally rotated (NO in step 3). As a result, it is judged that the forklift 21 is proceeding in a forward direction, i.e., advancing (step 7).

As described above, when the direction of movement of the forklift 21 is judged by the proceeding direction judging section 3 whether it is an advancing direction or a reversing direction, the result of judgment is announced by the display 4 and the advancing chime 5 or the reversing buzzer 6.

Specifically, in the case where it is judged by the proceeding direction judging section 3 that the proceeding direction of the forklift 21 is an advancing direction, information expressing the proceeding direction of the forklift 21 is sent to the display 4 arranged in the operator's seat and also sent to the advancing chime 5 arranged inside the vehicle body. On the display 4, mark F10 shown in FIG. 5 is turned on. This mark F10 informs the operator of the movement of the forklift 21 which is going to advance. The advancing chime 5 informs the workers in the surrounding areas of the movement of the forklift 21 which is going to advance in a forward direction.

On the other hand, in the case where the proceeding direction judging section 3 judges that the proceeding direction of the forklift 21 is a reverse direction, information expressing the proceeding direction of the forklift 21 is sent to the display 4 and the reversing buzzer 6 provided inside the vehicle body. On the display 4, mark R11 shown in FIG. 5 is turned on. This mark R11 informs the operator of the movement of the forklift 21 which is going to move in a reverse direction. The reversing buzzer 6 informs the workers in the surrounding area of the forklift 21 of the movement of the forklift 21 which is going to move in the reverse direction.

When the forklift 21 is moving as described above, the proceeding direction of the forklift 21, which has been judged by the proceeding direction judging section 3, is output by a sound of the advancing chime 5 or the reverse buzzer 6. Therefore, the workers in the surrounding area of the forklift 21 can positively know the direction in which the moving forklift 21 will proceed. Since the proceeding direction of the forklift 21 is displayed on the display 4, it is possible for the operator to drive the forklift 21 while confirming the direction movement of the forklift 21.

In this connection, it is impossible for the above proceeding direction judging section 3 to judge the proceeding direction of the forklift 21 when the running motor 32 is not rotated. Therefore, it is impossible to announce to the workers in the surrounding area of the running direction of the forklift 21 before it moves.

In order to solve the above problem, in the forklift 21 of this embodiment, there are provided a driving wheel stoppage detecting section 7, storing section 8 and start detecting section 9 as shown in FIG. 1. By those elements, it is possible to announce to the workers in the surrounding area of the impending direction of movement of the forklift 21 before it moves.

The driving wheel stoppage detecting section 7 detects that the running motor 32 has stopped, and this stoppage information is sent to the storing section 8. The storing section 8 receives the stoppage information from the driving wheel stoppage detecting section 7 and stores a proceeding direction of the forklift 21 immediately before receiving the driving wheel stoppage information. When the operator inserts a key into a predetermined position so as to start the forklift 21, the start detecting section 9 detects that the forklift 21 has started. When the start detecting section 9 detects that the forklift 21 has started in this way, the proceeding direction of the forklift 21 immediately before the driving wheel 24 has stopped, which is stored in the storing section 8, is sent to the display 4 and the advancing chime 5 or the reversing buzzer 6. The proceeding direction of the forklift 21 immediately before the driving wheel 24 has stopped is announced by the display 4, the advancing chime 5 or the reverse buzzer 6.

In the case where information, which expresses that the running direction of the forklift 21 immediately before the driving wheel 24 has stopped is an advancing direction, is stored in the storing section 8, when the start detecting section 9 detects that the forklift 21 has started, information expressing that the running direction of the forklift 21 is an advancing direction is sent to the display 4 and the advancing chime 5. On the display 4, mark F10 shown in FIG. 5 is turned on, so that the operator is informed of the movement of the forklift 21 which is going to advance. The advancing chime 5 warns the workers in the surrounding area of the movement of the forklift 21 which is going to advance.

On the other hand, in the case where information, which expresses that a running direction of the forklift 21 immediately before the driving wheel 24 stops is a reversing direction, is stored in the storing section 8, when it is detected by the start detecting section 9 that the forklift 21 has been started, information expressing that the running direction of the forklift 21 is a reversing direction is sent to the display 4 and the reverse buzzer 6. Then, on the display 4, mark R11 shown in FIG. 5 is turned on. Therefore, mark R11 informs the operator of the reversing movement of the forklift 21. The reverse buzzer 6 warns the workers in the surroundings of a reverse movement of the forklift 21 by sound.

As described above, when the forklift 21 starts moving, the running direction of the forklift 21 immediately before it stops is displayed on the display 4. Therefore, when the operator judges that the forklift 21 may collide with a load if the forklift 21 runs as it is, a selection of the directional switch 23 is changed over so as to invert the rotary direction of the driving wheel 24. In this way, the running direction of the forklift 21 can be inverted. It is possible for the workers in the surrounding area of the forklift 21 to previously know the running direction of the forklift 21 which is starting to move. Therefore, the workers in the surrounding area of the forklift 21 can avoid coming into contact with the forklift 21.

In the embodiment described above, explanations are made for a seat-riding reach type forklift. However, the present invention is not limited to the seat-riding reach type forklift. For example, it is possible to apply the present invention to forklifts of other types such as a stand-riding reach type forklift.

As explained above, according to the present invention, a precise running direction of the forklift can be alerted to the operator and other workers by the announcing section. Therefore, it is possible to prevent erroneous judgments of the direction of movement of the forklift.

Referring to the drawings, an embodiment in which the present invention is applied to a reach type forklift will be specifically explained as follows.

Figure 15:
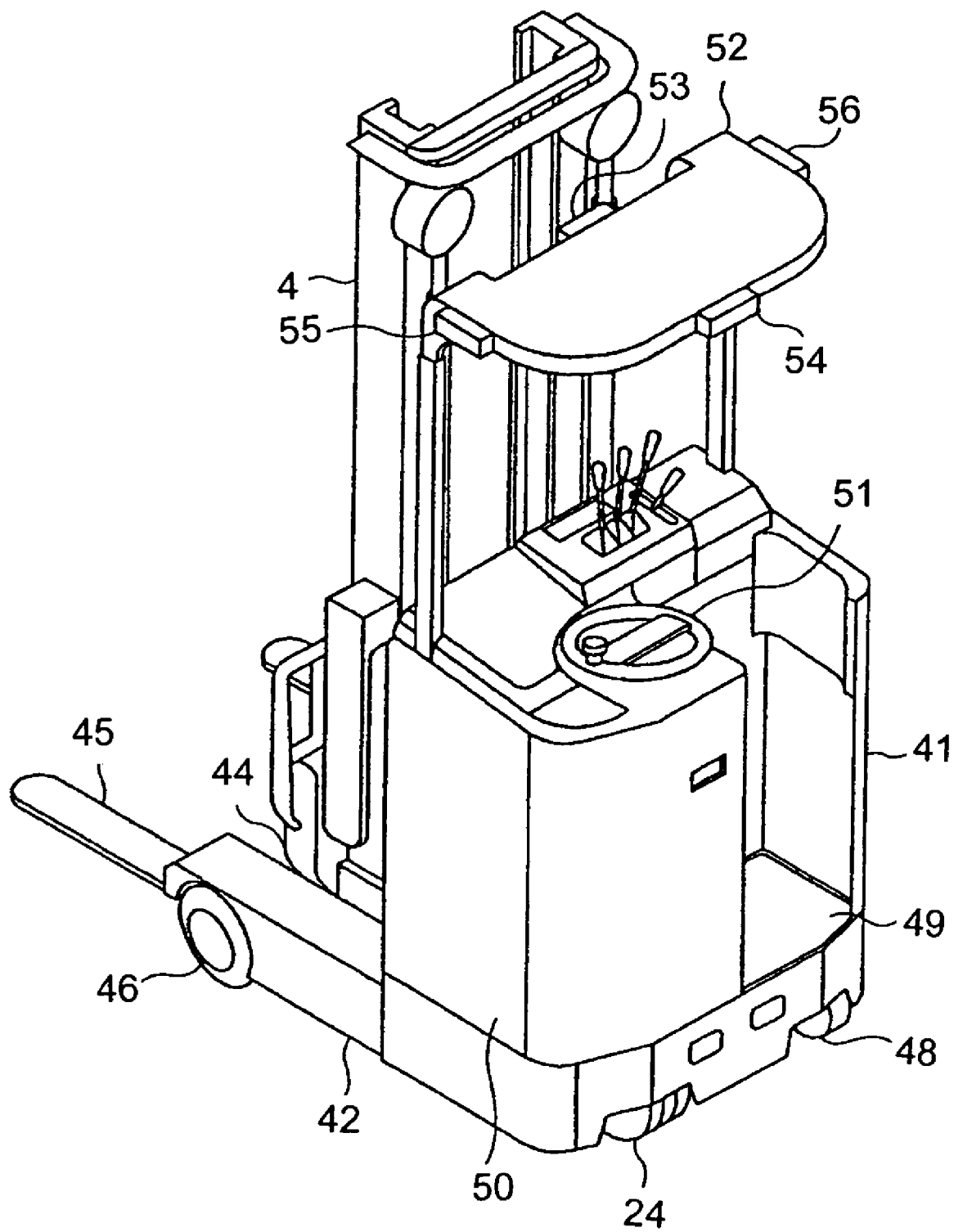
FIG. 15 is a perspective view of a reach type forklift, the driving wheel of which can be revolved by 360°, of an embodiment of the present invention.
Figure 16:
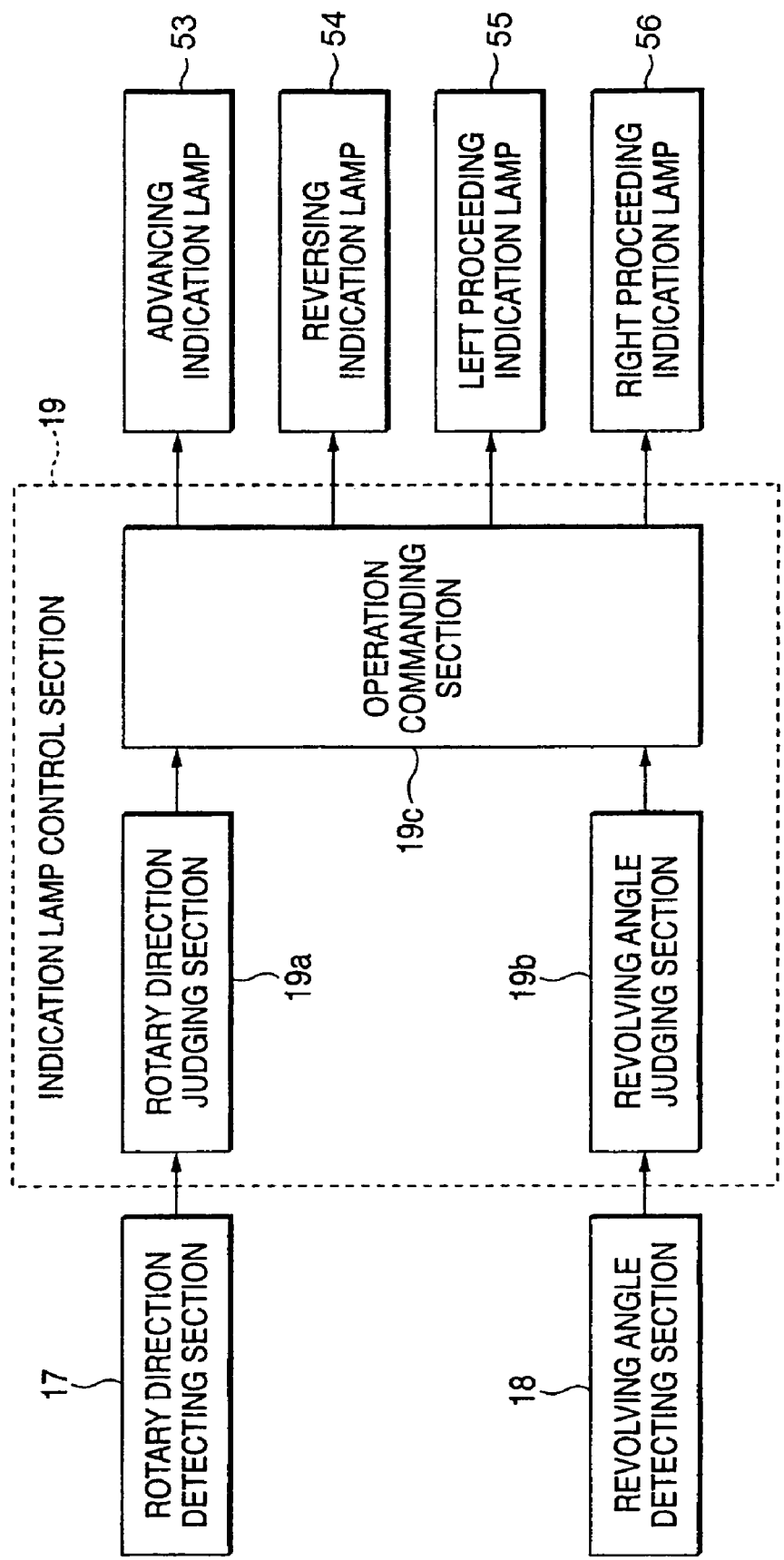
FIG. 16 is a functional block diagram showing a portion of the embodiment of the present invention.

FIG. 15 is a perspective view of a reach type forklift related to this embodiment, and FIG. 16 is a functional block diagram of a portion of the reach type forklift.

As shown in FIG. 15, this reach type forklift includes: right and left straddle arms 42 arranged in the front portion of a vehicle body 41; a mast 43 supported by the straddle arms 42 in such a manner that the mast 43 can be freely protruded and retracted; a lift bracket 44 supported by the mast 43 in such a manner that the lift bracket 44 can be elevated along the mast 43; and forks 45 tiltably supported by the bracket 44. At the forward end portion of each straddle arm 42, a load wheel 46 is pivotally supported. At the left side portion of the vehicle body 41, a driving wheel 24 is pivotally supported in such a manner that the driving wheel 24 can be revolved round the longitudinal axial center by 360°. At the right side portion of the vehicle body 41, a free wheel 48 is supported. This reach type forklift can run by these load wheels 46, driving wheel 24 and free wheel 48.

In the right side section of the vehicle body 41, there is provided a step 49 on which an operator stands. When the operator operates the handle 51 arranged on an upper side of a power room 50 in which a running motor to drive the driving wheel 24 arranged in the left rear section of the vehicle body 41 is accommodated, the driving wheel 24 can be revolved around the longitudinal axial center.

Further, in an upper rear portion of the vehicle body 41, there is provided a guard 52 to protect the operator standing on the step 49. At the front edge portion of this guard 52, there is provided an advancing indication lamp 53 to indicate a movement of the forklift in the direction of the fork 45. At the rear edge portion of the guard 52, there is provided a reversing indication lamp 54 to indicate a movement of the forklift in the reverse direction. At the left edge portion of the guard 52, there is provided a left proceeding indication lamp 55 to indicate a movement of the vehicle body 41 to left. At the right edge portion of the guard 52, there is provided a right proceeding indication lamp 56 to indicate a movement of the vehicle body 41 to right. In this case, each indication lamp is an electric lamp electrically connected with a battery (not shown) mounted on the vehicle body 41 of this reach type forklift. When electric power is supplied, each indication lamp can be turned on. In this embodiment, the advancing indication lamp 53, reversing indication lamp 54, left proceeding indication lamp 55 and right proceeding indication lamp 56 are intermittently turned on by a predetermined period.

As shown in FIG. 16, this reach type forklift includes: an advancing indication lamp 53, reversing indication lamp 54, left proceeding indication lamp 55 and right proceeding indication lamp 56. Further, this reach type forklift includes: a rotary direction detecting section 17 for detecting a rotary direction around a wheel shaft of the driving wheel 24; a revolving angle detecting section 18 for detecting a revolving angle θ around the longitudinal axis center of the driving wheel 24; and an indication lamp control section 19 composed of a microcomputer, which selectively turns on one of the indication lamps corresponding to the rotary direction of the driving wheel 24 detected by the rotary direction detecting section 17 and also corresponding to the revolving angle θ of the driving wheel 24 detected by the revolving angle detecting section 18.

The rotary direction detecting section 17 is composed of a rotary encoder to detect a rotary direction of the driving wheel 24 around the wheel shaft, and the revolving angle detecting section 18 is composed of a rotary encoder to detect a revolving angle θ of the driving wheel 24 around the longitudinal axial center. In this case, concerning the revolving angle θ of the driving wheel 24, irrespective of how much the driving wheel 24 is revolved clockwise or counterclockwise, the revolving angle θ of the driving wheel 24 indicates a present position of the driving wheel 24 with respect to the front direction of the vehicle body 41. Concerning the rotary direction of the driving wheel 24, the normal rotary direction is defined as a rotary direction of the driving wheel 24 in the case where the reach type forklift advances under the condition that the driving wheel 24 is not revolved, that is, the revolving angle θ=0°. And the opposite rotary direction is defined as a reverse direction. Accordingly, when the driving wheel 24 is normally rotated under the condition that the driving wheel 24 is revolved by 180° with respect to the front direction of the vehicle body 41, the reach type forklift is reversed.

The indication lamp control section 19 includes: a rotary direction judging section 19a for judging a rotary direction of the driving wheel 24; a revolving angle judging section 19b for judging a range in which the revolving angle θ of the driving wheel 24 exists; and an operation commanding section 19c for giving an operation command to the indication lamp to be operated according to the result of judgment. According to the control program explained as follows, the indication lamp control section 19 selectively turns on the indication lamp.

Figure 17:
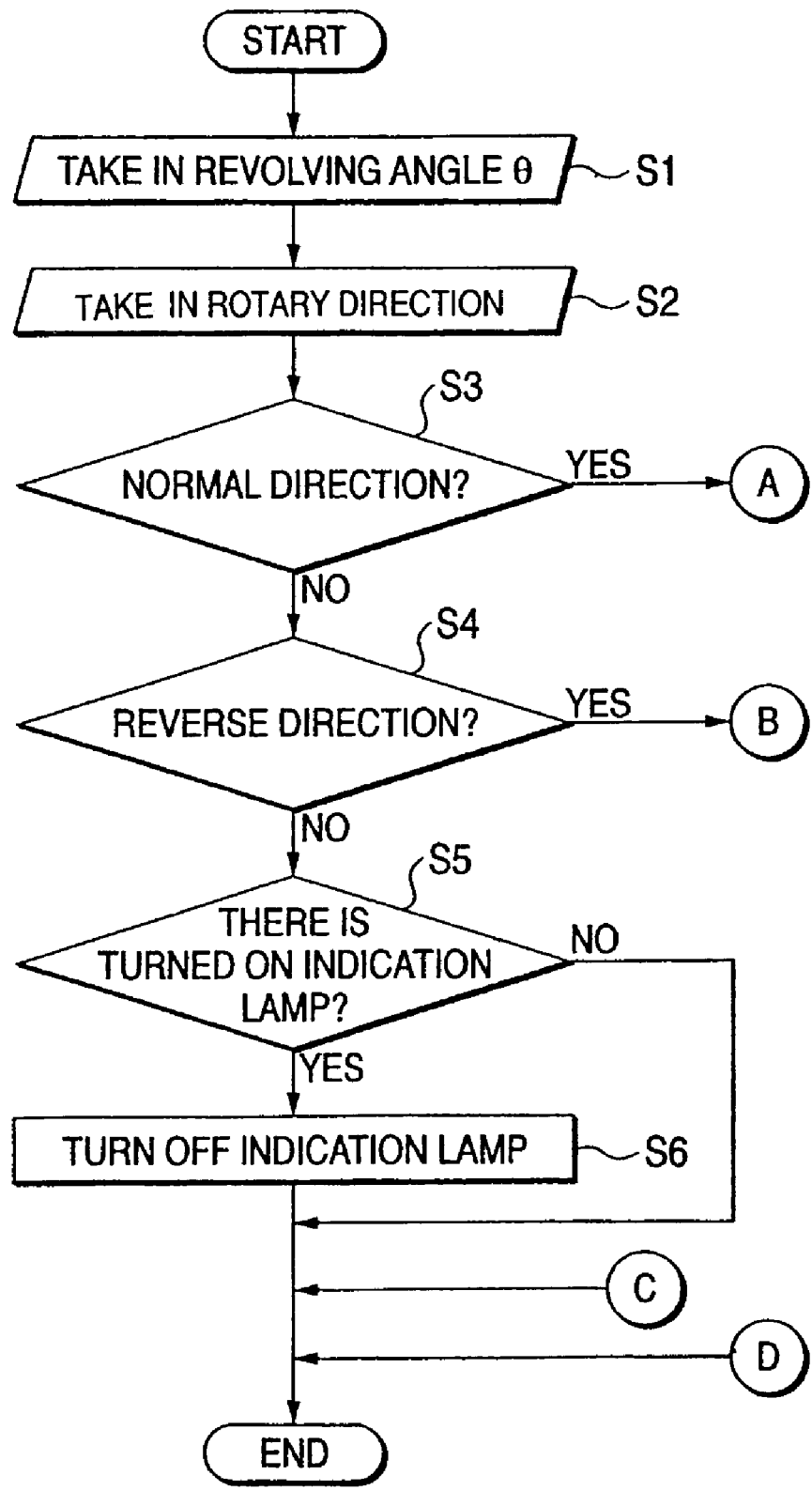
FIG. 17 is a flow chart showing a control program of the embodiment.
Figure 18:
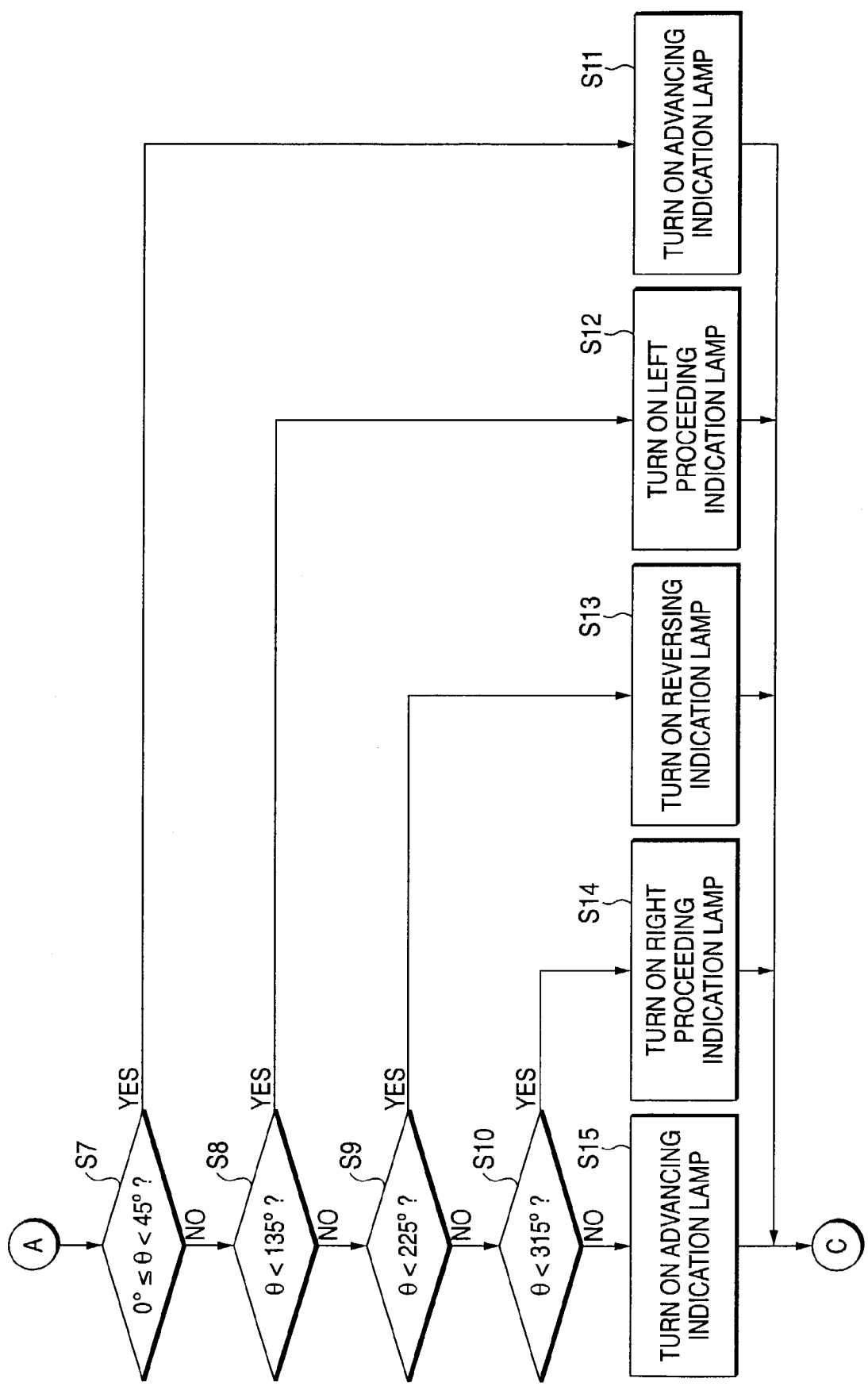
FIG. 18 is a flow chart showing a control program of the embodiment.
Figure 19:
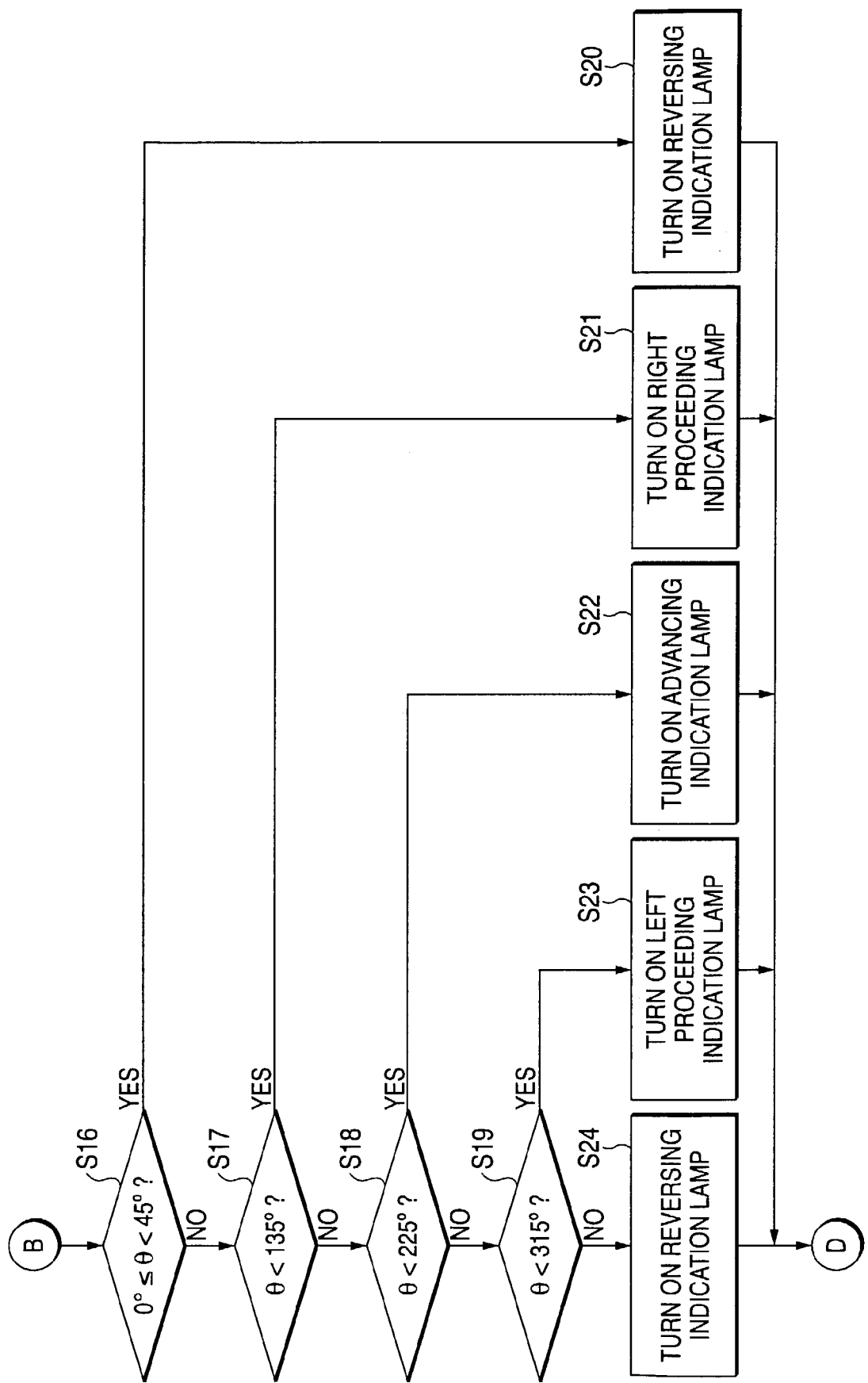
FIG. 19 is a flow chart showing a control program of the embodiment.

FIGS. 17 to 19 are flow charts of the control program of this indication lamp control section 19. As shown in FIG. 17, first, the indication lamp control section 19 takes in a revolving angle θ of the driving wheel 24 around the longitudinal axial center from the revolving angle detecting section 18 (S1). Further, the indication lamp control section 19 takes in a rotary direction of the driving wheel 24 around the wheel shaft (S2). Next, in the rotary direction detecting section 19a, it is judged whether or not the rotary direction of the driving wheel 24, which has been taken in the above process, is normal (S3). When it is judged that the rotary direction of the driving wheel 24 is not normal (NO in S3), it is judged whether or not the rotary direction of the driving wheel 24 is reverse (S4).

In the case where it is judged in the rotary direction detecting section 19a that the rotary direction is normal (YES in S3), as shown in FIG. 18, it is judged in the revolving angle judging section 19b whether or not the revolving angle θ which has been taken in is more than 45° counterclockwise with respect to the front direction (θ=0°) of the vehicle body 41 (S7). In the case where the revolving angle θ which has been taken in is more than 45° (NO in S7), it is judged whether or not the revolving angle θ is more than 135° with respect to the front direction (θ=0°) of the vehicle body 41 (S8). In the case where the revolving angle θ is more than 135° (NO in S8), it is judged whether or not the revolving angle θ is more than 225° with respect to the front direction (θ=0°) of the vehicle body 41 (S9). In the case where the revolving angle θ is more than 225° (NO in S9), it is judged whether or not the revolving angle θ is more than 315° with respect to the front direction (θ=0°) of the vehicle body 41, that is, it is judged whether or not the revolving angle θ is more than −45° (S10).

As described above, the revolving angle θ of the driving wheel 47 is judged. In the case where the revolving angle θ is in a range from not less than 0° to less than 45° (YES in S7), the indication commanding section 19c turns on the advancing indication lamp 53 (S11). In the case where the revolving angle θ is in a range from not less than 45° to less than 135° (YES in S8), the indication commanding section 19c turns on the left proceeding indication lamp 55 (S12). In the case where the revolving angle θ is in a range from not less than 135° to less than 225° (YES in S9), the indication commanding section 19c turns on the reversing indication lamp 54 (S13). In the case where the revolving angle θ is in a range from not less than 225° to less than 315° (YES in S10), the indication commanding section 19c turns on the right proceeding indication lamp 56 (S14). In the case where the revolving angle θ is in a range from not less than 315° to less than 360°, that is, in the case where the revolving angle θ is in a range from not less than −45° to less than 0° (NO in S10), the indication commanding section 19c turns on the advancing indication lamp 53 (S15).

In the case where it is judged in the rotary direction judging section 19a that the rotary direction is reverse (YES in S4), as shown in FIG. 19, it is judged in the revolving angle judging section 19b whether or not the revolving angle θ which has been taken in is more than 45° counterclockwise with respect to the front direction (θ=0°) of the vehicle body 41 (S16). In the case where the revolving angle θ which has been taken in is more than 45° (NO in S16), it is judged whether or not the revolving angle θ is more than 135° with respect to the front direction (θ=0°) of the vehicle body 41 (S17). In the case where the revolving angle θ is more than 135° (NO in S17), it is judged whether or not the revolving angle θ is more than 225° with respect to the front direction (θ=0°) of the vehicle body 41 (S18). In the case where the revolving angle θ is more than 225° (NO in S18), it is judged whether or not the revolving angle θ is more than 315° with respect to the front direction (θ=0°) of the vehicle body 41, that is, it is judged whether or not the revolving angle θ is more than −45° (S19).

As described above, the revolving angle θ of the driving wheel 47 is judged. In the case where the revolving angle θ is in a range from not less than 0° to less than 45° (YES in S16), the indication commanding section 19c turns on the reversing indication lamp 54 (S20). In the case where the revolving angle θ is in a range from not less than 45° to less than 135° (YES in S17), the indication commanding section 19c turns on the right proceeding indication lamp 56 (S21). In the case where the revolving angle θ is in a range from not less than 135° to less than 225° (YES in S18), the indication commanding section 19c turns on the advancing indication lamp 53 (S22). In the case where the revolving angle θ is in a range from not less than 225° to less than 315° (YES in S19), the indication commanding section 19c turns on the left proceeding indication lamp 55 (S23). In the case where the revolving angle θ is in a range from not less than 315° to less than 360°, that is, in the case where the revolving angle θ is in a range from not less than −45° to less than 0° (NO in S22), the indication commanding section 19c turns on the reversing indication lamp 54 (S24).

On the other hand, in the case where the rotary direction detecting section 19a judges that the rotary direction is not reverse (NO in S4 of FIG. 17), the reach type forklift is stopped, and it is unnecessary that the indication lamp is turned on. Therefore, the indication commanding section 19c judges whether or not any indication lamp is turned on (S5). In the case where a certain indication lamp is turned on (YES in S5), it is turned off, so that indication of the proceeding direction is stopped (S6).

As described above, when one of the four directions of the front, rear, right and left is indicated by turning on one of the advancing indication lamp 53, reversing indication lamp 54, left proceeding indication lamp 55 and right proceeding indication lamp 56, workers in the surroundings of the forklift can visually recognize a state of the indication lamps. Therefore, they can know a proceeding direction of the reach type forklift. When the reach type forklift is started and the driving wheel 24 starts rotating, either indication lamp is automatically turned on so that the workers in the surrounding area of the forklift can visually recognize a movement of the forklift, that is, the workers in the surrounding area of the forklift can immediately know a proceeding direction of the forklift. According to the result of recognizing the movement of the forklift, the workers in the surrounding area of the forklift can take shelter in an appropriate place. Therefore, it is possible for the workers in the surrounding area of the forklift to positively prevent from coming into contact with the vehicle body 41 of the reach type forklift or the loads carried on the forks 45. As a result, the safety can be remarkably enhanced.

As a result of the visual recognition of the indication lamp, which is turned on, by the workers in the surrounding area of the forklift, they can recognize that other persons or obstacles are in the way of the reach type forklift. Therefore, it is possible for them to warn the operator of the forklift and other persons. Accordingly, it is possible for the reach type forklift to avoid coming into contact with persons and obstacles in the way of the forklift.

In this reach type forklift, while the electric power source is turned on, the control program of this indication lamp control section 19 and predetermined control programs such as a running speed control program, steering control program and loading and unloading control program are repeatedly carried out by a predetermined order. Accordingly, not only while the forklift is running straight, but also while the forklift is being operated for steering or loading and unloading, the indication lamp can be automatically turned on. Therefore, the workers in the surrounding area of the forklift can positively recognize the proceeding direction of the forklift.

In this embodiment, all indication lamps are controlled by the indication lamp control section 19. However, the advancing indication lamp 53 and reversing indication lamp 54 may be controlled differently from the left proceeding indication lamp 55 and right proceeding indication lamp 56. The advancing indication lamp 53 may be replaced with a head lamp 63, and the reversing indication lamp 54 may be replaced with a rear lamp 64. Then, the head lamp 63, rear lamp 64, left proceeding indication lamp 55 and right proceeding indication lamp 56 may be controlled according to the revolving angle and the rotary direction of the driving wheel 24. An embodiment in this case will be explained as follows. In this connection, like reference characters are used to indicate like parts in the aforementioned embodiment and this additional embodiment, and the detailed explanations will be omitted here. In this embodiment, the left proceeding indication lamp 55 and the right proceeding indication lamp 56 are intermittently turned on at a predetermined period, however, the head lamp 63 and the rear lamp 64 are continuously turned on.

Figure 20:
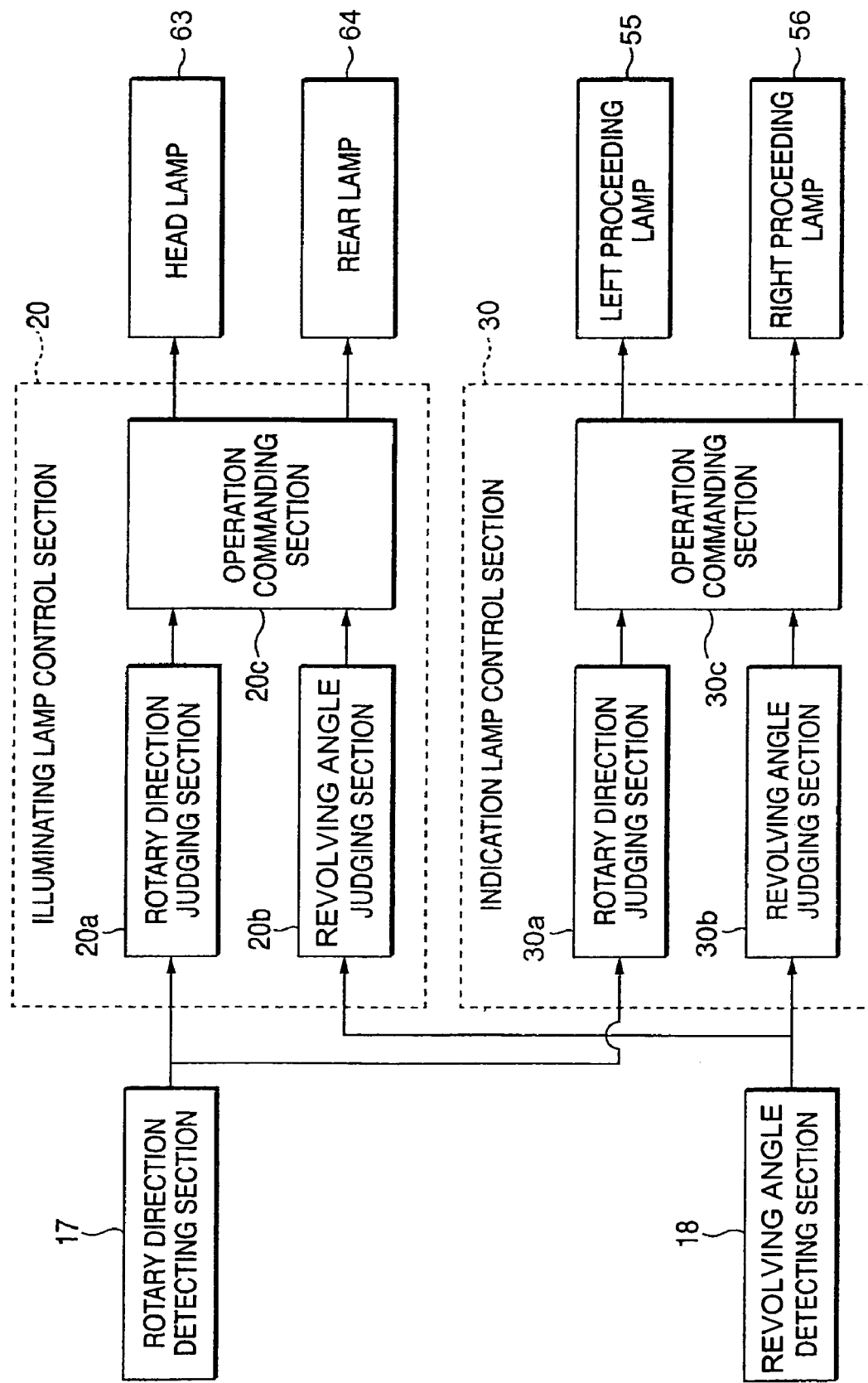
FIG. 20 is a functional block diagram showing a portion of another embodiment of the present invention.

FIG. 20 is a functional block diagram of a portion of the reach type forklift of this embodiment. As shown in FIG. 20, the reach type forklift of this embodiment includes: a rotary direction detecting section 17; and a revolving angle detecting section 18. In addition to that, the reach type forklift of this embodiment further includes: an illuminating lamp control section 20 for continuously turning on the head lamp 63 or the rear lamp 64 according to the rotary direction of the driving wheel 24 detected by the rotary direction detecting section 17 and also according to the revolving angle θ of the driving wheel 24 detected by the revolving angle detecting section 18; and an indication lamp control section 30 for intermittently turning on the left proceeding indication lamp 55 or the right proceeding indication lamp 56 according to the rotary direction of the driving wheel 24 detected by the rotary direction detecting section 17 and also according to the revolving angle θ of the driving wheel 24 detected by the revolving angle detecting section 18. In this connection, the illuminating lamp control section 20 and the indication lamp control section 30 are respectively composed of microcomputers. However, the illuminating lamp control section 20 and the indication lamp control section 30 may be composed of one micro-computer and operated in such a manner that the micro-computer functions as the illuminating lamp control section 20 or the indication lamp control section 30 according to the control program to be carried out.

The illuminating lamp control section 20 includes: a rotary direction judging section 20a for judging the rotary direction of the driving wheel 24; a revolving angle judging section 20b for judging a range of the revolving angle θ of the driving wheel 24; and an operation commanding section 20c for giving an operation command to the head lamp 63 or the rear lamp 64 according to the result of judgment. The illuminating lamp control section 20 selectively turns on the head lamp 63 or the rear lamp 64 according to the control program explained below.

Figure 21:
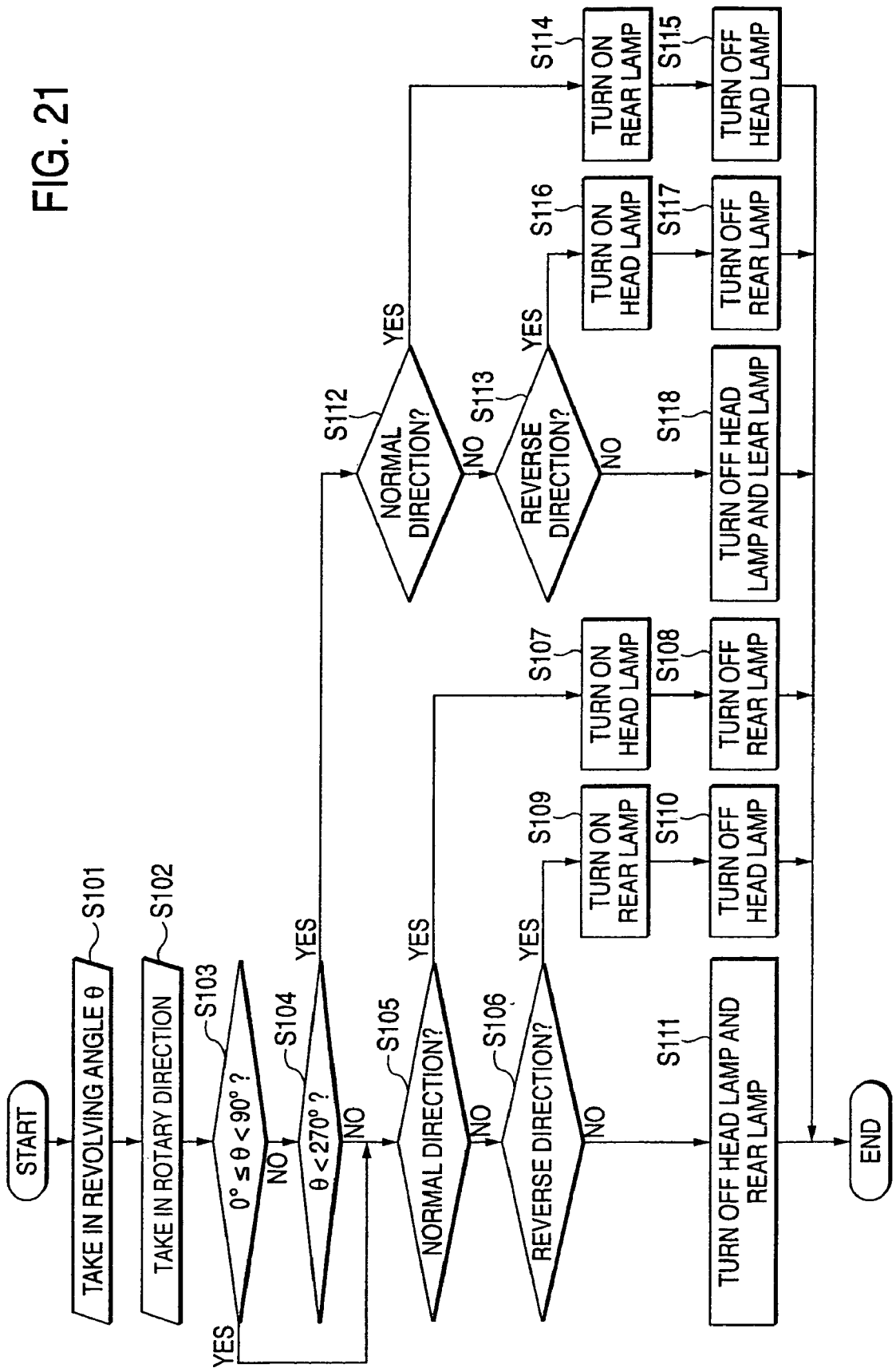
FIG. 21 is a flow chart showing a control program of the embodiment.

FIG. 21 is a flow chart of the control program of the illuminating lamp control section 20. As shown in FIG. 21, first, the illuminating lamp control section 20 takes in a revolving angle θ around the longitudinal axial center of the driving wheel 24 from the revolving angle detecting section 18 (S101). Further, the illuminating lamp control section 20 takes in a rotary direction around the wheel shaft of the driving wheel 24 from the rotary direction detecting section 17 (S102). Next, in the revolving angle judging section 20b, it is judged whether or not the revolving angle θ taken in is more than 90° counterclockwise with respect to the front direction (θ=0°) of the vehicle body 41 (S103). In the case where the revolving angle θ taken in is more than 90° (NO in S103), it is judged whether or not the revolving angle θ is more than 270° with respect to the front direction (θ=0°) of the vehicle body 41, that is, it is judged whether or not the revolving angle θ is more than −90° (S104).

After the revolving angle θ of the driving wheel 24 has been judged in this way, the rotary direction judging section 20a judges whether or not the rotary direction of the driving wheel 24, which has been taken in, is normal (S105, S112). In the case where the rotary direction judging section 20a judges that the rotary direction of the driving wheel 24 is not normal (NO in S105 and S112), it is judged whether or not the rotary direction of the driving wheel 24 is reverse (S106, S113).

In the case where the revolving angle θ of the driving wheel 24 is in a range from not less than 0° to less than 90° (YES in S103), when it is judged that the rotary direction of the driving wheel 24 is normal (YES in S105), the indication commanding section 20c turns on the head lamp 63 (S107) and turns off the rear lamp 64 (S108). When it is judged that the rotary direction of the driving wheel 24 is not normal but reverse (YES in S106), the indication commanding section 20c turns on the rear lamp 64 (S109) and turns off the head lamp 63 (S110). In the case where the revolving angle θ is not less than 270°, that is, in the case where the revolving angle θ is in a range from not less than −90° to less than 0° (NO in S104), in the same manner, when it is judged that the rotary direction of the driving wheel 24 is normal (YES in S105), the indication commanding section 20c turns on the head lamp 63 (S107) and turns off the rear lamp 64 (S108). When it is judged that the rotary direction of the driving wheel 24 is not normal but reverse (YES in S106), the indication commanding section 20c turns on the rear lamp 64 (S109) and turns off the head lamp 63 (S110).

In the case where the revolving angle θ of the driving wheel 24 is in a range from not less than 90° to less than 270° (YES in S104), when it is judged that the rotary direction of the driving wheel 24 is normal (YES in S112), the indication commanding section 20c turns on the rear lamp 64 (S114) and turns off the head lamp 63 (S115). When it is judged that the rotary direction of the driving wheel 24 is not normal but reverse (YES in S113), the indication commanding section 20c turns on the head lamp 63 (S116) and turns off the rear lamp 64 (S117).

In the case where it is judged by the rotary direction detecting section 20a that the rotary direction is not reverse (NO in S106 and S113), the reach type forklift is stopped. Therefore, it is unnecessary to turn on the head lamp 63 and the rear lamp 64. Accordingly, the indication commanding section 20c turns off both the head lamp 63 and the rear lamp 64 (S111, S118).

As described above, in the case of advancing, the head lamp 63 is automatically turned on, and in the case of reversing, the rear lamp 64 is automatically turned on. Therefore, it is unnecessary for the operator to manually operate the switch each time. Accordingly, the labor of operation can be saved. Further, there is no possibility that the operator forgets to operate the switch. Furthermore, it is possible to avoid a delay in operating the switch. Accordingly, the front and the rear of the reach type forklift can be positively illuminated by the head lamp 63 and the rear lamp 64, which remarkably enhances the safety of carrying out loading and unloading operations. Since both the head lamp 63 and the rear lamp 64 are automatically turned off when the reach type forklift is stopped, a waste of electric power consumption can be prevented. Further, life of the head lamp 63 and the rear lamp 64 can be extended.

On the other hand, the indication lamp control section 30 includes: a rotary direction judging section 30a for judging a rotary direction of the driving wheel 24; a revolving angle judging section 30b for judging a range in which the revolving angle θ of the driving wheel 24 exists; and an operation commanding section 30c for giving an operation command to the indication lamp to be operated according to the result of judgment. According to the control program explained as follows, the indication lamp control section 19 selectively turns on the left proceeding indication lamp 55 or right proceeding indication lamp 56. In this connection, in this embodiment, in the case where the revolving angle θ of the driving wheel 24 does not satisfy either the condition in which the revolving angle θ is in a range from not less than 45° to less than 135° or the condition in which the revolving angle θ is in a range from not less than −135° to less than −45°, it is judged that the reach type forklift is advancing or reversing, and neither the left proceeding indication lamp 55 nor the right proceeding indication lamp 56 is turned on. However, it is possible to set the revolving angle θ, by which advancing or reversing of the forklift is judged, at an appropriate value. For example, in the case where the revolving angle θ of the driving wheel 24 does not satisfy either the condition in which the revolving angle θ is in a range from not less than 5° to less than 175° or the condition, in which the revolving angle θ is in a range from not less than −175° to less than −5°, it may be judged that the reach type forklift is advancing or reversing.

Figure 22:
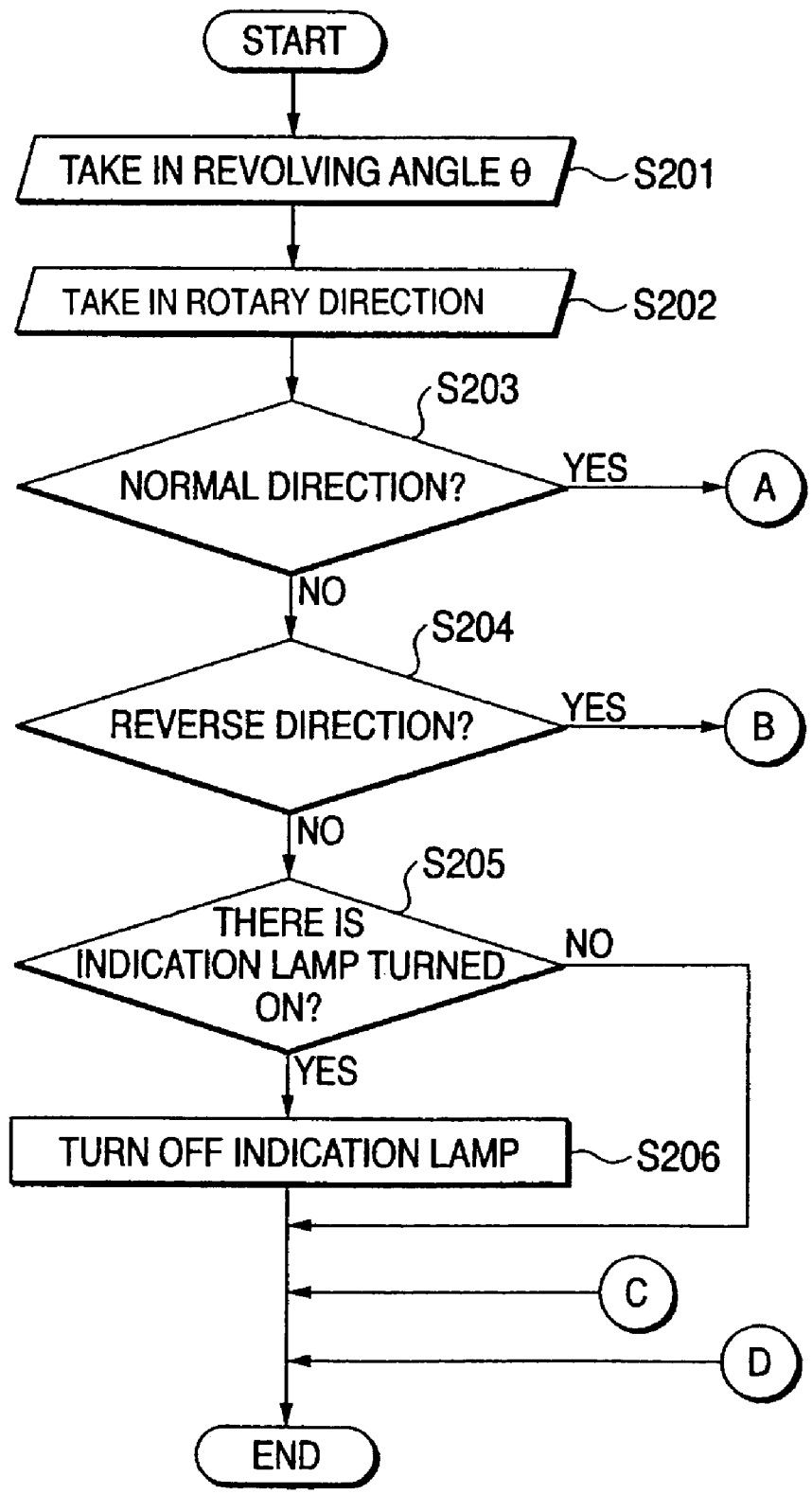
FIG. 22 is a flow chart showing a control program of the embodiment.
Figure 23:
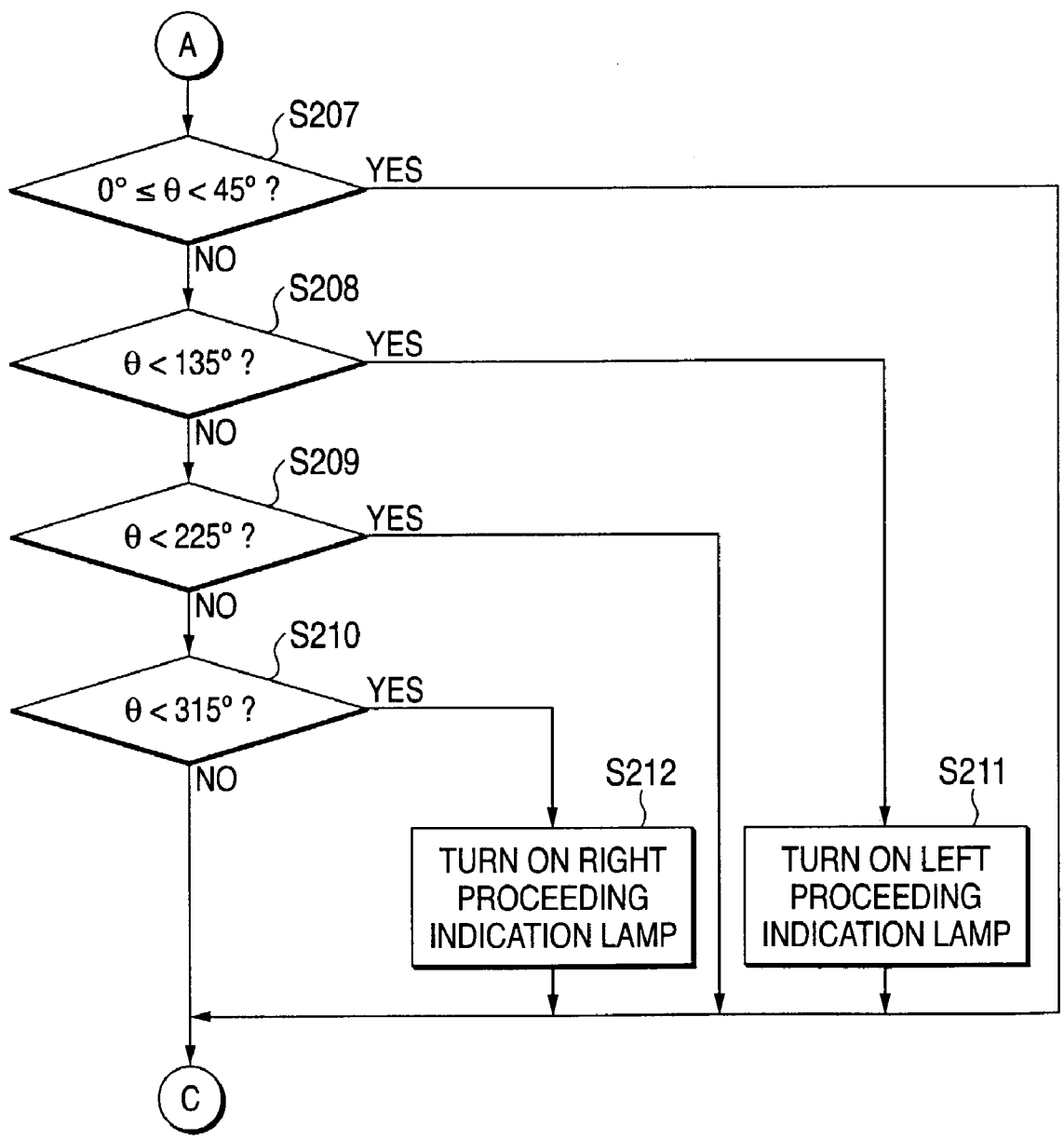
FIG. 23 is a flow chart showing a control program of the embodiment.
Figure 24:
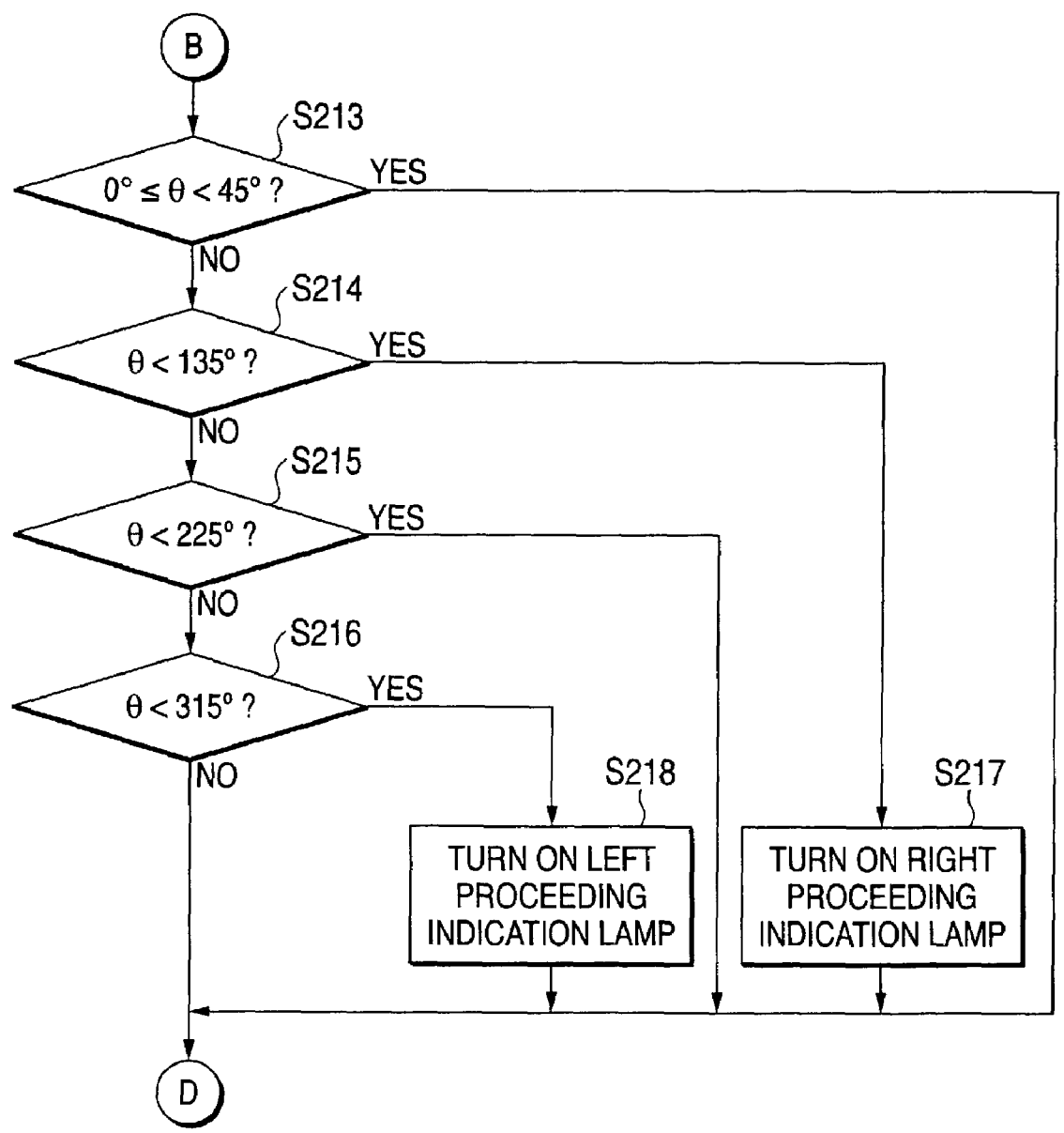
FIG. 24 is a flow chart showing a control program of the embodiment.

FIGS. 22 to 24 are flow charts of the control program of the indication lamp control section 30. As shown in FIG. 22, the indication lamp control section 30 takes in a revolving angle θ round the longitudinal axial center of the driving wheel 24 from the revolving angle detecting section 18 (S201). Further, the indication lamp control section 30 takes in a rotary direction around the wheel shaft of the driving wheel 24 from the rotation detecting means 17 (S202). Next, the rotary direction detecting section 30a judges whether or not the rotary direction of the driving wheel 24, which has been taken in, is normal (S203). In the case where the rotary direction detecting section 30a judges that the rotary direction of the driving wheel 24 is not normal (NO in S203), it is judged whether or not the rotary direction of the driving wheel 24 is reverse (S204).

In the case where it is judged in the rotary direction detecting section 30a that the rotary direction is normal (YES in S203), as shown in FIG. 23, it is judged in the revolving angle judging section 30b whether or not the revolving angle θ which has been taken in is more than 45° counterclockwise with respect to the front direction (θ=0°) of the vehicle body 41 (S207). In the case where the revolving angle θ which has been taken in is more than 45° (NO in S207), it is judged whether or not the revolving angle θ is more than 135° with respect to the front direction (θ=0°) of the vehicle body 41 (S208). In the case where the revolving angle θ is more than 135° (NO in S208), it is judged whether or not the revolving angle θ is more than 225° with respect to the front direction (θ=0°) of the vehicle body 41, that is, it is judged whether or not the revolving angle θ is more than 135° (S209). In the case where the revolving angle θ is more than 225° (NO in S209), it is judged whether or not the revolving angle θ is more than 315° with respect to the front direction (θ=0°) of the vehicle body 41, that is, it is judged whether or not the revolving angle θ is more than −45° (S210).

As described above, the revolving angle θ of the driving wheel 24 is judged. In the case where the revolving angle θ is in a range from not less than 45° to less than 135° (YES in S207), the operation commanding section 30c turns on the left proceeding indication lamp 55 (S211). In the case where the revolving angle θ is in a range from not less than 225° to less than 315°, that is, in the case where the revolving angle θ is in a range from not less than −135° to less than 45°, (YES in S210), the operation commanding section 30c turns on the right proceeding indication lamp 56 (S212). In this connection, in the case where the revolving angle θ of the driving wheel 24 does not satisfy either the condition in which it is in a range from not less than 45° to less than 135° or the condition in which it is in a range from not less than −135° to less than −45°, it can be judged that the reach type forklift is advancing or reversing. Therefore, the operation commanding section 30c does not turn on the indication lamp.

In the case where it is judged in the rotary direction judging section 30a that the rotary direction is reverse (YES in S204), as shown in FIG. 24, it is judged in the revolving angle judging section 30b whether or not the revolving angle θ is more than 45° counterclockwise with respect to the front direction (θ=0°) of the vehicle body 4 (S213). In the case where the revolving angle θ is more than 45° (NO in S213), it is judged whether or not the revolving angle θ is more than 135° with respect to the front direction (θ=0°) of the vehicle body 41 (S214). In the case where the revolving angle θ is more than 135° (NO in S214), it is judged whether or not the revolving angle θ is more than 225° with respect to the front direction (θ=0°) of the vehicle body 41, that is, it is judged whether or not the revolving angle θ is more than −135° (S215). In the case where the revolving angle θ is more than 225° (NO in S215), it is judged whether or not the revolving angle θ is more than 315° with respect to the front direction (θ= 0°) of the vehicle body 41, that is, it is judged whether or not the revolving angle θ is more than −45° (S216).

As described above, the revolving angle θ of the driving wheel 24 is judged. In the case where the revolving angle θ is in a range from not less than 45° to less than 135° (YES in S214), the operation commanding section 30c turns on the right proceeding indication lamp 56 (S217). In the case where the revolving angle θ is in a range from not less than 225° to less than 315°, that is, in the case where the revolving angle θ is in a range from not less than −135° to less than −45° (YES in S216), the operation commanding section 30c turns on the left proceeding indication lamp 55 (S218). In this connection, in the case where the revolving angle θ of the driving wheel 24 does not satisfy either the condition in which it is in a range from not less than 45° to less than 135° or the condition in which it is in a range from not less than −135° to less than −45°, it can be judged that the reach type forklift is advancing or reversing. Therefore, the operation commanding section 30c does not turn on the indication lamp.

On the other hand, as shown in FIG. 22, in the case where it is judged by the rotary direction detecting section 30a that the rotary direction is not reverse (NO in S204), the reach type forklift is stopped. Therefore, it is unnecessary to turn on the indication lamp. Accordingly, the operation commanding section 30c judges whether or not the indication lamp is turned on (S205). In the case where the indication lamp is turned on (YES in S205), the operation commanding section 30c turns off the indication lamp, so that the indication of the proceeding direction is stopped (S206).

As described above, in the case of proceeding to left, the left proceeding indication lamp 55 is automatically turned on, and in the case of proceeding to right, the right proceeding indication lamp 56 is automatically turned on. Therefore, it is unnecessary for the operator to manually operate the switch each time. Accordingly, the labor of operation can be saved. Further, there is no possibility that the operator forgets to operate the switch. Therefore, workers in the surrounding area of the forklift can positively, visually recognize a state of the indication lamps and know a proceeding direction of the forklift, which remarkably enhances the safety.

Explanations are made above into an example in which the present invention is applied to a reach type forklift. However, it should be noted that the present invention is not only applied to the reach type forklift but also applied to other types of forklifts such as a picking-lift.

As explained above, according to the present invention, even when an operator does not operate a switch, each indication lamp can be automatically turned on. Therefore, workers in the surrounding area of the forklift can positively, visually recognize a proceeding direction of the forklift by an indication lamp being turned on. When the workers in the surrounding area of the forklift take shelter in an appropriate place according to the result of recognition, it becomes possible for the workers in the surrounding area of the forklift to positively avoid coming into contact with a body of the forklift and a load carried by the forklift. Accordingly, safety can be remarkably enhanced.

According to the present invention, even when the operator does not operate, the head lamp or the rear lamp can be automatically turned on. Therefore, the front or the rear portion of the forklift can be positively illuminated by the head lamp or rear lamp. Accordingly, the operator can easily ascertain the circumstances of the front or the rear portion of the forklift. As a result, safety can be remarkably enhanced.

What is claimed is:

1. A forklift comprising:
   a driving wheel capable of being steered through 360°;
   a steering angle detecting section for detecting a steering angle of the driving wheel;
   a rotary direction detecting section for detecting a rotary direction of the driving wheel;
   a running direction judging section for judging a running direction of the forklift based on the steering angle of the driving wheel detected by the steering angle detecting section and the rotary direction of the driving wheel detected by the rotary direction detecting section; and
   an announcing section for indicating the result of judgment obtained by the running direction judging section.

2. A forklift according to claim 1, wherein the steering angle detecting section is capable of detecting a steering angle of the driving wheel in a range from −180° to +180° with respect to the front direction of the forklift,
   the rotary direction detecting section detects whether the driving wheel is rotating normally or reversely,
   the running direction judging section determines that a running direction of the forklift is in an advancing direction when a steering angle of the driving wheel is in a range from −90' to +90° with respect to the front direction of the forklift and the driving wheel is normally rotated,
   the running direction judging section determines that a running direction of the forklift is in a reversing direction when a steering angle of the driving wheel is in a range from −90° to +90° with respect to the front direction of the forklift and the driving wheel is reversely rotated,
   the running direction judging section determines that a running direction of the forklift is in the reversing direction when a steering angle of the driving wheel is outside a range from −90° to +90° with respect to the front direction of the forklift and the driving wheel is normally rotated, and the running direction judging section determines that a running direction of the forklift is in the advancing direction when a steering angle of the driving wheel is outside a range from −90° to +90° with respect to the front direction of the forklift and the driving wheel is reversely rotated.

3. A forklift according to claim 2, wherein the announcing section is provided with a display for visually displaying the running direction judging section result for an operator to view, the display displays that the forklift is advancing when the running direction judging section determines that the forklift is advancing, and the display displays that the forklift is reversing when the running direction judging section determines that the forklift is reversing.

4. A forklift according to claim 2, wherein the announcing section is provided with a sound outputting section for acoustically outputting the result of the running direction judging section to the surroundings of the forklift, the sound outputting section outputs a sound expressing that the forklift is advancing when the running direction judging section determines that the forklift is advancing, and the sound outputting section outputs a sound expressing that the forklift is reversing when the running direction judging section determines that the forklift is reversing.

5. A forklift according to claim 1, further comprising:

a driving wheel stoppage detecting section for detecting the stoppage of rotation of the driving wheel;

a storing section for storing a running direction of the forklift immediately before rotation of the driving wheel is stopped when stoppage of the rotation of the driving wheel is detected by the driving wheel stoppage detecting section; and a start detecting section for detecting a start of the forklift, wherein the announcing section indicates the running direction stored in the storing section when the start detecting section detects that the forklift is started.

6. A forklift comprising:

a vehicle body;

a driving wheel capable of revolving through 360°;

an advancing indication lamp for indicating the vehicle body will move in a forward direction;

a reversing indication lamp for indicating the vehicle body will move in a reverse direction;

a left proceeding indication lamp for indicating the vehicle body will move in the left direction;

a right proceeding indication lamp for indicating the vehicle body will move in the right direction;

a revolving angle detecting section for detecting a revolving angle of the driving wheel with respect to the longitudinal center axis of the vehicle body;

a rotary direction detecting section for detecting a rotary direction of the driving wheel; and an indication lamp control section for turning on one of said left proceeding indication lamp and said right proceeding indication lamp based on the revolving angle and the rotary direction, wherein the indication lamp control section turns on the advancing indication lamp when the revolving angle is in a range of −45° to +45° with respect to the front direction of the vehicle body and the rotary direction is normal, and when the revolving angle is in a range from not less than 135° to less than 180° with respect to the front direction of the vehicle body or the revolving angle is in a range from not less than −180° to less than −135° and the rotary direction is reverse, the indication lamp control section turns on the reversing indication lamp when the revolving angle is in a range of −45° to +45° with respect to the front direction of the vehicle body and the rotary direction is reverse, and when the revolving angle is in a range from not less than 135° to less than 180° with respect to the front direction of the vehicle body or the revolving angle is in a range from not less than −180° to less than −135° and the rotary direction is normal, the indication lamp control section turns on the left proceeding indication lamp when the revolving angle is in a range from not less than 45° to less than 135° with respect to the front direction of the vehicle body and the rotary direction is normal, and when the revolving angle is in a range from not less than −135° to less than −45° with respect to the front direction of the vehicle body and the rotary direction is reverse, and the indication lamp control section turns on the right proceeding indication lamp when the revolving angle is in a range from not less than 45° to less than 135° with respect to the front direction of the vehicle body and the rotary direction is reverse, and when the revolving angle is in a range from not less than −135° to less than −45° with respect to the front direction of the vehicle body and the rotary direction is normal.

7. A forklift comprising:

a vehicle body;

a driving wheel capable of revolving through 360°;

a left proceeding indication lamp for indicating the vehicle body will proceed to left;

a right proceeding indication lamp for indicating the vehicle body will proceed to right;

a revolving angle detecting section for detecting a revolving angle of the driving wheel from a longitudinal axial center of the vehicle body;

a rotary direction detecting section for detecting a rotary direction of the driving wheel; and an indication lamp control section for turning on one of said left proceeding indication lamp and said right proceeding indication lamp based on the revolving angle and the rotary direction, wherein the indication lamp control section turns on the left proceeding lamp when the revolving angle is in a range from not less than a first angle to less than a second angle counterclockwise with respect to the front direction of the vehicle body and the rotary direction is normal, and when the revolving angle is in a range from not less than the first angle to less than the second angle clockwise with respect to the front direction of the vehicle body and the rotary direction is reverse, and the indication lamp control section turns on the right proceeding lamp when the revolving angle is in a range from not less than the first angle to less than the second angle counterclockwise with respect to the front direction of the vehicle body and the rotary direction is reverse, and when the revolving angle is in a range from not less than the first angle to less than the second angle clockwise with respect to the front direction of the vehicle body and the rotary direction is normal.

8. A forklift comprising:
a vehicle body;
a driving wheel capable of revolving through 360°;
a head lamp for illuminating the front of the vehicle body;
a rear lamp for illuminating the rear of the vehicle body;
a rotary direction detecting section for detecting a rotary direction of the driving wheel; and
an illuminating lamp control section for controlling whether each of the head lamp and rear lamp are turned on based on a revolving angle and the rotary direction,
wherein the illuminating lamp control section turns on the head lamp and turns off the rear lamp when the revolving angle is in a range of −90° to +90° with respect to the front direction of the vehicle body and the rotary direction is normal, and when the revolving angle is outside of a range of −90' to +90° with respect to the front direction of the vehicle body and the rotary direction is reverse, and
the illuminating lamp control section turns off the head lamp and turns on the rear lamp when the revolving angle is in a range of −90° to +90° with respect to the front direction of the vehicle body and the rotary direction is reverse, and when the revolving angle is outside the range of −90° to +90° with respect to the front direction of the vehicle body and the rotary direction is normal.

* * * * *